United States Patent
Rajagopal et al.

(10) Patent No.: US 11,176,470 B2
(45) Date of Patent: Nov. 16, 2021

(54) ARTIFICIAL INTELLIGENCE BASED SOLUTION GENERATOR

(71) Applicant: ACCENTURE GLOBAL SOLUTIONS LIMITED, Dublin (IE)

(72) Inventors: Sandeep Rajagopal, Mumbai (IN); Madan Kumar, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 666 days.

(21) Appl. No.: 16/028,939

(22) Filed: Jul. 6, 2018

(65) Prior Publication Data
US 2019/0012605 A1    Jan. 10, 2019

(30) Foreign Application Priority Data
Jul. 7, 2017    (IN) .............................. 201711024018

(51) Int. Cl.
*G06N 5/04*    (2006.01)
*G06N 20/00*    (2019.01)
(Continued)

(52) U.S. Cl.
CPC ........... *G06N 5/045* (2013.01); *G06F 40/279* (2020.01); *G06F 40/40* (2020.01); *G06N 5/003* (2013.01);
(Continued)

(58) Field of Classification Search
CPC ........ G06N 20/20; G06N 5/045; G06N 20/00; G06N 5/003; G06N 20/10; G06N 3/08;
(Continued)

(56) References Cited

U.S. PATENT DOCUMENTS

| | | | |
|---|---|---|---|
| 8,903,711 B2 * | 12/2014 | Lundberg | G06F 40/58 704/8 |
| 2013/0304761 A1 | 11/2013 | Redlich et al. | |
| 2015/0012467 A1 | 1/2015 | Greystoke et al. | |
| 2017/0039181 A1 * | 2/2017 | Karov | G06F 40/30 |

FOREIGN PATENT DOCUMENTS

JP    4738523 B2    8/2011

OTHER PUBLICATIONS

Albattah MMS. Optimum Highway Design and Site Location Using Spatial Geoinformatics Engineering. Journal of Remote Sensing & GIS. 2016 (Year: 2016).*

(Continued)

*Primary Examiner* — Alexey Shmatov
*Assistant Examiner* — Qamar Iqbal
(74) *Attorney, Agent, or Firm* — Mannava & Kang, P.C.

(57) ABSTRACT

A solution generation and planning system uses Artificial Intelligence (AI) techniques such as machine learning (ML) data models, predictive analytics and natural language processing (NLP) techniques for generating outputs to aid decision making in the domain of public infrastructure development. The problem statement is analyzed using the NLP techniques to generate word tokens which are employed in identifying issues that aid in selection of appropriate data sources from a plurality of discrete data sources. In addition, data models trained to produce probable solutions for the issue are also selected. The probable solutions are presented to the user who selects one of the probable solutions for implementation. Feedback from the implementation is also incorporated so that the data models are updated per the latest information obtained from the implementation of the user-selected solution.

20 Claims, 19 Drawing Sheets

(51) Int. Cl.
  *G06Q 10/06* (2012.01)
  *G06N 5/00* (2006.01)
  *G06N 20/20* (2019.01)
  *G06F 40/40* (2020.01)
  *G06F 40/279* (2020.01)
  *G06N 3/08* (2006.01)
  *G06N 20/10* (2019.01)

(52) U.S. Cl.
  CPC .............. *G06N 20/00* (2019.01); *G06N 20/20* (2019.01); *G06Q 10/063* (2013.01); *G06Q 10/0637* (2013.01); *G06N 3/08* (2013.01); *G06N 20/10* (2019.01)

(58) Field of Classification Search
  CPC ..... G06F 40/279; G06F 40/40; G06Q 10/063; G06Q 10/0637
  See application file for complete search history.

(56) References Cited

OTHER PUBLICATIONS

John Capece. Population Growth and Water Demand Model For Port LaBelle, Florida. Southern Datastream, Inc. Aug. 2007 (Year: 2007).*

Jaimyoung Kwon, Benjamin Coifman, and Peter Bickel. Day-to-Day Travel-Time Trends and Travel-Time Prediction from Loop-Detector Data. Transportation Research Record. Jan. 2000 (Year: 2000).*

Ali Bou Nassif. Short Term Power Demand Prediction Using Stochastic Gradient Boosting. IEEE. Dec. 2016. (Year: 2016).*

James M. W. Wong. Albert P. C. Chan. Y. H. Chiang. Modeling Construction Occupational Demand: Case of Hong Kong. Journal of Construction Engineering and Management. Sep. 2010 (Year: 2010).*

* cited by examiner

ARTIFICIAL INTELLIGENCE BASED SOLUTION GENERATOR

PRIORITY

The present application claims priority under 35 U.S.C. 119(a)-(d) to the Indian Provisional Patent Application Serial No. 201711024018, having a filing date of Jul. 7, 2017, the disclosure of which is hereby incorporated by reference in its entirety.

BACKGROUND

The ubiquitous presence of computers in almost every home, office, factory or other establishments has led to availability of enormous quantities of data covering almost every aspect of life. In addition to historical data, real-time data is continuously produced via various electronic items such as but not limited to equipment in factories, automobile or other vehicular hardware, consumer cell phones, and the like. Huge data centers having capacity to store and process enormous amount of data are also established by both businesses and by Governments. The data centers cover large acreage that houses thousands of servers that can configured to receive and store structured or unstructured data. The data thus stored can be utilized for designing, building and maintaining computer systems in addition to providing insights into the workings of particular processes.

BRIEF DESCRIPTION OF DRAWINGS

Features of the present disclosure are illustrated by way of examples shown in the following figures. In the following figures, like numerals indicate like elements, in which:

FIG. 15 shows a projects UI in accordance with the examples disclosed herein.

FIG. 16 shows a water resources UI that is generated in accordance with the examples disclosed herein.

DETAILED DESCRIPTION

Figure 1:
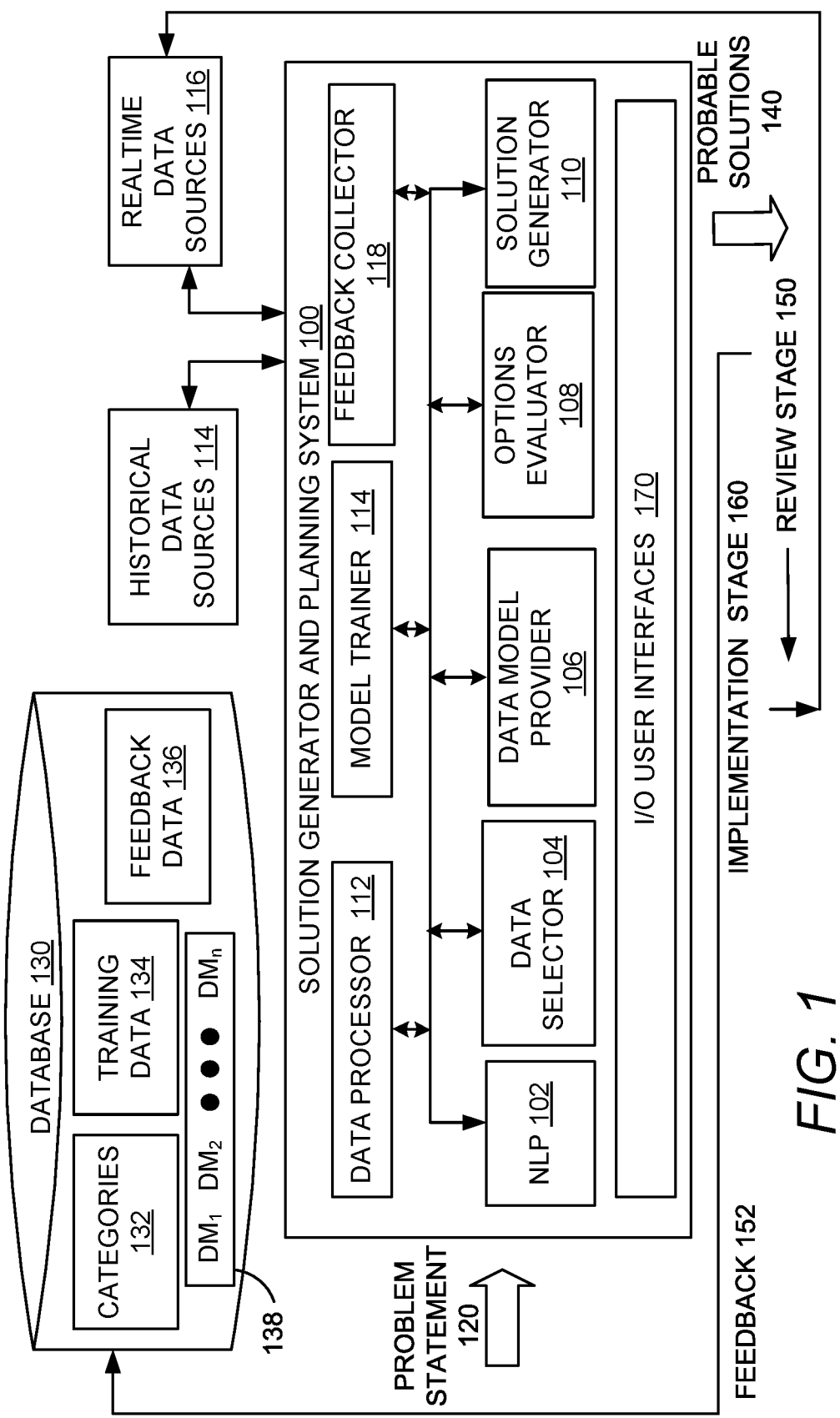
FIG. 1 shows a block diagram of a solution generator and planning system in accordance with one example.

For simplicity and illustrative purposes, the present disclosure is described by referring to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

According to one or more examples described herein, a natural language processing (NLP) based solution generation and planning system analyzes data from a plurality of discrete data sources and provides probable solutions to a problem statement received from a user. The solution generation and planning system initially processes the problem statement using NLP techniques to generate word tokens. A problem statement can include one or more words pertaining to a process or a task to be executed. The words may or may not be arranged in a grammatically accurate order of a natural language. The word tokens generated from the problem statement enable the solution generation and planning system to identify the task and one or more issues associated with the process. Based at least on the task and the issues, the solution generation and planning system extracts the required data from one or more of the plurality of discrete data sources.

In addition, the solution generation and planning system also selects one or more of a plurality of machine learning (ML) data models using the word tokens. The solution generation and planning system then employs the data models to analyze or process data from the selected discrete data sources. The solution generation and planning system in turn provides the user with a plurality of probable solutions that are rated in accordance with various factors. The solution generation and planning system receives not only the user selection of a probable solution from the plurality of probable solutions but also continues to obtain real-time data during the implementation stage of the selected probable solution. One or more of the plurality of ML data models are thus improved via feedback to generate solutions that better solve the issues presented by users. The issues raised by the users can include but are not limited to infrastructure, transportation, water and sanitation, information and communications, power generation, economy, defense, education, environment and forest, finance, food, foreign affairs, governance and administration, health and family welfare, home affairs and enforcement, industries, information and broadcasting, labor and employment, rural and urban development, travel and tourism, housing and social development.

Discrete data sources can be data repositories associated with different organizations that may not be connected to each other. Accordingly, such discrete data repositories can include structured and non-structured data in different data formats following different data patterns with different access rights/access mechanisms. The plurality of discrete data sources can further include publicly available data sources or proprietary/private data sources which store one or more of historic data and real-time data. The solution generation and planning system includes a data processor which cleans and transforms the data for use by the data models. In an example, the cleaned, transformed data may be stored in a local database of the solution generation and planning system. A selected one of the ML data models is initially built using the plurality of discrete data sources by employing one or more of logistic regression, K nearest neighbors (KNN) and Support Vector Machines (SVM) techniques and the like. When the user desires to explore solutions to an issue, the user can be presented with a category and/or sub-category selection in addition to being enabled to supply a problem statement in natural language in some examples. In an example, the problem statement can be processed via parsing and obtaining word tokens which are to be used in conjunction with the category selections for identifying the data to use.

A selected trained data model is configured to generate multiple possible solutions addressing the issue. Out of the multiple possible solutions, the trained data model may further select top N (N=1, 2, 3 . . . ) possible solutions to present to the user via an output user interface as N probable solutions. It can be appreciated that the one or more of the data models can generate many possible solutions of which some are more likely to be implemented or some solutions are more probable as the solutions better address the issues to be dealt with during the task execution. The rating of the multiple possible solutions may be based on default factors or factors selected by the user via an input user interface. When a user selects one of the probable solutions, feedback regarding the user selection is received. The feedback enables the trained data model to be further fine-tuned thereby increasing the accuracy of the probable solutions with each issue addressed by the solution generation and planning system. Moreover, the solution generation and planning system also receives real-time data during implementation of the selected possible solution which enables further improvements in the predictions/probable solutions generated by the solution generation and planning system. Moreover, the real-time data received by the solution generation and planning system during the implementation stage enables using the solution generation and planning system as a project management tool which tracks the progress of the project and makes projection regarding timelines, budgets, resources and the like based on variations in the various factors.

The solution generation and planning system disclosed herein addresses the technical challenges involved in analyzing data from discrete, unconnected data sources and gleaning insights therefrom. Since the data sources are discrete and unconnected, the data can be stored therein in different data formats in accordance with various data schemes. Moreover, certain data elements that can provide additional information such as, conclusions that can be drawn from the intersection of data from such data sources, can be missing from the discrete data sources. For example, an employment database may not include weather patterns. As a result, insights that can be gleaned regarding seasonal employment may be missing when exploring solutions to a problem statement related to availability of workforce. Therefore, even if the data is publicly available, the conclusions cannot be determined due to the missing data elements which reduces the utility of such data sources. The solution generation and planning system extracts, transforms and loads data from such discrete data sources into local databases and trains the plurality of ML data models on such data drawn from the plurality of discrete data sources. The different ML data models thus trained are able to generate new data elements connecting multiple ones of the discrete data sources which may not be otherwise present in either of the data sources. In fact, the feedback elements of the solution generation and planning system also enable synchrony between the discrete data sources so that if the data in one of the discrete data sources is updated then the ML data models are able to update their output and consequently the insights associated therewith. The solution generation and planning system is therefore, able to generate new, additional data elements and insights that are otherwise unavailable in an environment where the discrete data sources remain unconnected even if available publicly.

The solution generation and planning system disclosed herein provides a technology-based solution to various challenges faced in implementing projects in government and private sectors. These can include lack of coordination across government departments wherein each department works as a silo even with dependencies on other departments which results in delays and cost overruns. Moreover, each department collecting its own data without collaboration with other departments hampers efforts to develop analytics which help in making better decisions. As a result, projects such as large infrastructure improvements may face various problems due to land acquisitions, green clearances and the like. In addition, a lack of real-time data hampers efforts to track work in progress. Current historic data such as weather patterns, navigation data etc. which can predict or prescribe solutions on when to lay and complete infrastructure projects and the like also remains under-utilized.

By constructing various data models from the different data sources, the solution generation and planning system is able to make projections regarding different aspects of large projects. Moreover, by tracking real-time data, the solution generation and planning system is continuously improved in terms of the probable solutions it generates. Thus, the solution generation and planning system provides complete end-to-end solutions to projects starting from the pre-planning stage through the implementation stage. While only a few examples of functioning of solution generation and planning system are discussed herein for brevity, it can be appreciated that solution generation and planning system can be implemented for improvements in projects pertaining to any of the fields in which it may access historic data while tracking real-time data during implementation.

FIG. 1 shows a block diagram of the solution generator and planning system 100 in accordance with one example. The solution generator and planning system 100 receives a problem statement 120 pertaining to a variety of issues such as but not limited to, infrastructure projects, educational endeavors, governance and administrative tasks, and the like. The problem statement 120 is analyzed to determine a requirement and one or more issues related to the requirement. Based on the requirement, the solution generator and planning system 100 selects requisite data from a variety of discrete data sources including historical data sources 114 and real-time data sources 116 and using one or more of the data models 138 e.g., $DM_1$, $DM_2$ . . . $DM_n$, generates predictions or probable solutions 140. During an initial review stage 150, the personnel in charge of a project may review the probable solutions 140 and select one of the probable solutions 140 for implementation. The solution generator and planning system 100 further collects the real-time data from the real-time data sources 116 even during the implementation stage 160. One or more of the data models 138 are fine-tuned based on the collected real-time data which can improve the quality of the probable solutions that may be generated for subsequent issues.

It can be appreciated that the historical data sources 114 and the real-time data sources 116 can be any data source that is local or external and connected to the solution generator and planning system 100 via a LAN or WAN. The data sources 114, 116 can be publicly available data sources accessible for example via the Internet. The data sources 114, 116 may also include structured data sources such as relational data sources or unstructured data sources which may include data dumps from industrial machinery, sensors, data from various industrial, financial, telecommunication and other processes or metadata obtained therefrom.

In view of the variety of data sources that are to be accessed by the solution generator and planning system 100, a data processor 112 is coupled to the solution generator and planning system 100 to clean and transform the data. For example, the data from similar kinds of sensors from various industries, geographical locations and the like which may be formatted differently when received at the solution generator and planning system 100 and hence may need to be transformed by the data processor 112 into a uniform format and stored as training data 134. The training data 134 may be used to train the various data models 138 in generating the various probable solutions 140. In an example, the cleaned and transformed data may also be stored in the database 130 for use by the solution generator and planning system 100.

The process of generating the probable solutions 140 may begin with receiving user responses to certain queries by the solution generator and planning system 100 that will help in identifying the data sources to use for the analysis. In an example, the input user interfaces may be configured to allow user selection of a category associated with the problem for which a solution is sought from the solution generator and planning system 100. For example, if the problem relates to an infrastructure project, an infrastructure category may be selected from the various categories 132 presented by the input user interfaces. The categories 132 may also include sub-categories so that the selection of the infrastructure category may result in presentation of sub-categories such as road, canal, bridge, factory, school, hospital, residential or commercial structures, monuments and the like.

In addition to the categories 132 and the sub-categories, a problem statement 120 may be supplied by a user to one of the user interfaces 170 which may include both input user interfaces to receive the problem statement 120 or other input data and output user interfaces that can output the probable solutions 140 in accordance with examples detailed herein. In an example, tools such as Power BI, QLik or Tableau may be employed for generating the user interfaces 170 which may include interactive reports. The input user interfaces are configured to receive user inputs for not only generating the probable solutions 140 but enable fine-tuning the probable solutions 140 by a user by allowing the user to study the effects of various factors on project timelines and budget outlays during any of the pre-planning or implementation stages. The output user interfaces not only provide the probable solutions but also receive user selection of probable solutions 140. In an example, the users' may also be permitted to rate the probable solutions 140 generated by a solution generator 110 thereby providing explicit training to one or more of the data models 138.

As mentioned above, the problem statement 120 may pertain to any of the issues that can be addressed by analyzing the data from one or more of the historical data sources 114 and the real-time data sources 116 the details of which will be discussed further infra. A number of cases illustrating the probable solutions 140 from the solution generator and planning system 100 will also be discussed herein. While particular examples related to infrastructure projects such as but not limited to laying of roadways are discussed herein, it can be appreciated that this is not limiting and that the methodologies discussed herein can be applied for other purposes as well.

A natural language processor (NLP) 102 parses the problem statement 120 to generate the word tokens. The word tokens can include data of different data types such as but not limited to, strings, numerical, date, currency, special characters and the like. In addition, the NLP 102 can further include a POS tagger, a lemmatizer and an entity processor (not shown) for the processing of the word tokens. The word tokens can be filtered to remove gaps, stop words, punctuations and the like. The remaining word tokens can be further processed to identify alternate words such as synonyms and the like. Additionally, the entity processor can identify entities from the word tokens. In an example, the entities can include names of places, dates, people, or terms particular to a specific project and the like. The word tokens with the alternate words, entities etc. may be transmitted to the data selector 104 for selecting the appropriate data for solution generation. The data selector 104 employs the output from the NLP 102 to identify data from one or more of the historical data sources 114 and the real-time data sources 116 that can be used to generate the probable solutions 140. Common NLP engines such as but not limited to CORTANA or SIRI may be employed by the NLP 102.

The data from the data selector 104 is received by the data model provider 106 which further selects at least one of a plurality of trained data models 138 e.g., $DM_1$, $DM_2$ . . . $DM_n$ for processing the selected data. Various data models such as but not limited to linear regression models, decision trees, decision forests, neural networks, support vector machines (SVMs) and the like can be employed for producing potential solutions for various issues as detailed herein. As particular data models may fit particular problems/projections, each of the different data models 138 can be trained on different data inputs in order to provide the probable solutions 140. A model trainer 114 can be configured to train particular data models on specific data inputs for generating probable solutions 140 for problem statements containing specific keywords. The model trainer 114 can be configured to update the models periodically or each time the historical data or training data 134 is updated. In an example, the data model provider 106 can be pre-configured to select particular data model(s) for generating solutions for a specific problem. Accordingly, the NLP 102 may also communicate the tokens to data model provider 106. Based at least on the tokens and the data selected by the data selector 104, the data model provider 106 may select one or more of the data models 138 for processing the problem statement 120. The selected data model can analyze the data obtained by the data selector 104 to generate various options that can be responsive to the problem statement 120.

The plurality of options or possible solutions are evaluated by the options evaluator 108. The options evaluator 108 may evaluate the options produced by the selected data model based on various factors some of which may be common among various problems while other factors may be unique to particular problems. For example, particular infrastructure projects may have specific guidelines of recommended good practices associated therewith. The options evaluator 108 can be configured to evaluate the options based on compliance of the options with such good practices and output the top N options (N being a natural number) or top N probable solutions 140 which are shown the user via an output interface. In an example, further data models such as those based on vector distances can be employed to evaluate and rate the options. In addition, a single problem statement can be associated with multiple issues each of which may require analysis by a different data model. The options evaluator 108 can similarly evaluate various combinations of the options generated by the different data models to produce the probable solutions 140. Therefore, the options evaluator 108 can take into account many factors in order to rate the options and suggest the probable solutions 140 for user review.

By the way of illustration and not limitation, the input provided by the user to obtain the probable solutions 140 for addressing a water supply problem will be discussed herein. The user may initially select the category as 'infrastructure' and a sub-category as a 'water source'. In addition, the user may supply the problem statement 120 that pertains to a query for water resources for a town. The problem statement 120 may be parsed to obtain the name of the town. The data selector 104 may then employ the name of the town as a parameter to obtain data such as but not limited to names of water resources and water supply infrastructure in the vicinity of the town, weather data such as rainfall data, water table data, population of the town, amount of water consumed, availability of water in the nearby towns and the like. The data can be pulled by the data selector 104 from one or more of the data sources 114 and 116. In addition to the selected data, one of the plurality of data models 138 is selected for modeling the data. In an example, the selected data model can be a data model that was previously trained on the historical data of various water provision projects within the geographic region proximate to the town or even on historical data gathered from wider geographic region extending beyond the town.

The data selector 104 supplies the selected data to the selected data model which may output a plurality of options for probable solutions such as constructing a new water reservoir, or increasing usage of existing canals, implementing a new water sharing scheme with neighboring towns whereby each neighboring town gives up or sells a certain amount of water to the drought-stricken town and the like. In the present example of water resources, the options evaluator 108 may evaluate or score the options based on common factors such as but not limited to budget outlays and timelines required for implementing the option, the ease of implementing the options including environmental issues, Governmental departmental permissions/clearances, effects on local population, the demand-supply equation for labor associated with each option and the like. Based on the scores for each of the options, the options evaluator 108 may be configured to output top N options (where N is a natural number) which are rated as the most optimal among the available options as the probable solutions 140 for selection at the review stage 150. The probable solutions 140 may be presented via the user interfaces 170. When the user selects to implement one of the probable solutions 140, the feedback 152 regarding the user selected option may be stored as feedback data 136 within the database 130. In an example, the feedback data 136 may also be employed in fine tuning the data model provider 106.

Furthermore, when the user chooses to implement one of the probable solutions 140 or indeed any other solution not put forth by the solution generator and planning system 100, the solution generator and planning system 100 can be configured to collect real-time data, for example, by the feedback collector 118. The feedback collector 118 can be configured to collect real-time data from the various equipment employed in implementing or executing the solution in the implementation stage 160. The real-time data thus collected can be further accessed by the solution generator and planning system 100 to generate the probable solutions 140 when a next problem statement is received. Hence, a feedback loop is maintained by the solution generator and planning system 100 which records the impact or effectiveness of a selected one of the probable solutions 140.

Figure 2:
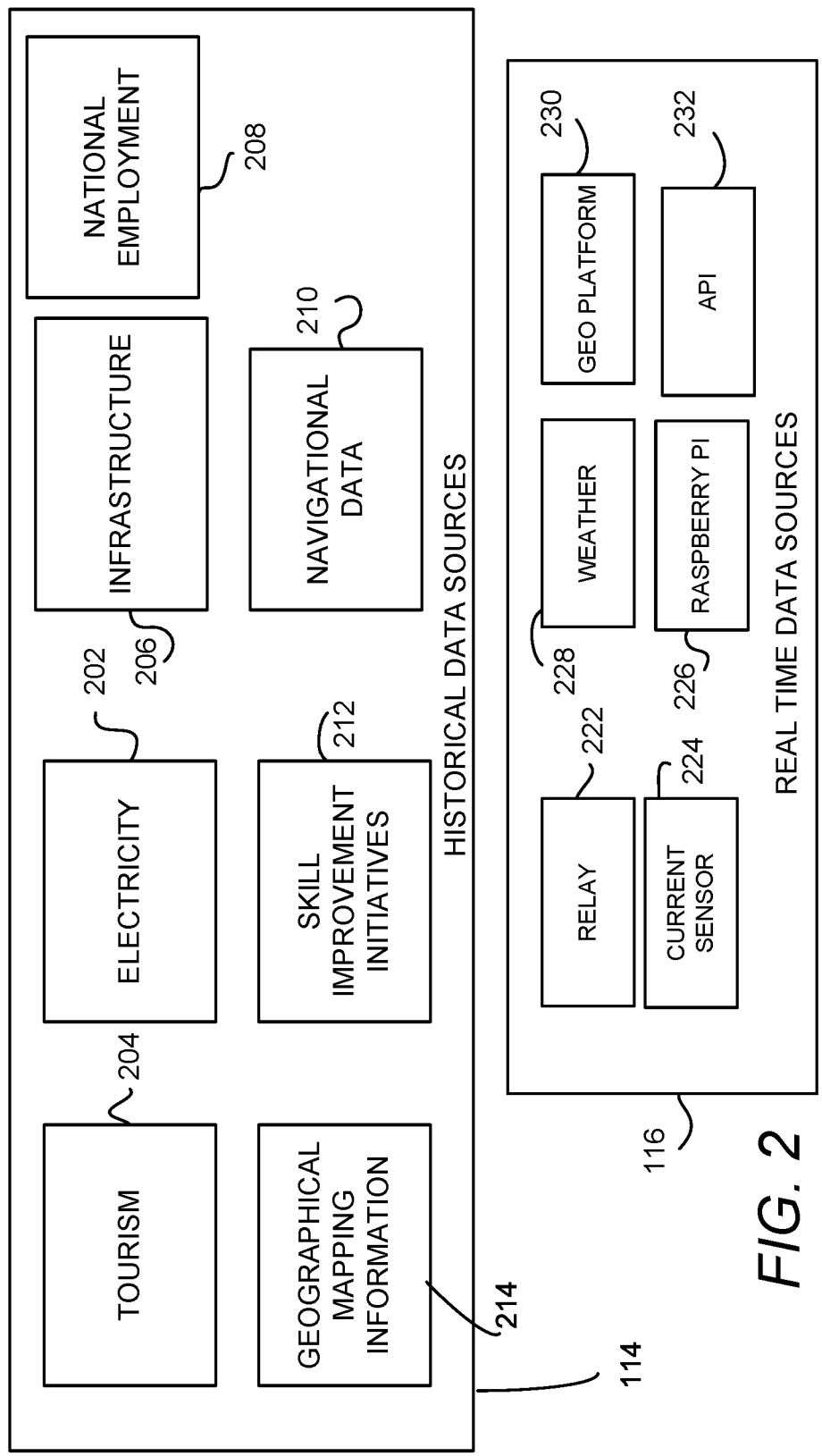
FIG. 2 shows some examples of data sources that may be used by the solution generator and planning system in accordance with the examples disclosed herein.

FIG. 2 shows some examples of the historical data sources 114 and the real-time data sources 116 that may be used by the solution generator and planning system 100 for generating the probable solutions 140. It can be appreciated that the data sources are discussed herein purely for illustrative purposes only and are not limiting and that any number and any type of data source can be used by the solution generator and planning system 100 to train and use the data model provider 106 in accordance with examples described herein. The historical data sources may include for e.g., data sources pertaining to electricity. For a given town, the data associated with electricity 202 may include data such as but not limited to, the locations of power stations, sub-stations, electric lines around the town, power plants that are proximate to the town, the sources of power such as if the power is generated locally or if the power is purchased and the like. The tourism data 204 may be defined for a given town in terms of the tourist traffic, distances between the various tourist places, transportation and other facilities such as hotels available within the vicinity of the town, time taken for the visits, demographic profiles of the tourists and the like. The infrastructure data 206 may include but is not limited to, historical construction project records, various infrastructure facilities around a given town such as but not limited to, roads, transportation, medical facilities, commercial establishments such as factories and the like. Navigational data 210 includes latitude, longitude of the town, its relative location within the state and/or country, the neighboring towns and the like.

The data sources 114 may include some governmental data sources such as databases of national employment 208 and skill improvement initiatives 212 may also be accessed by the solution generator and planning system 100 for producing the probable solutions. The employment databases 208 provide employment data, attributes of available human resources, the types of available workers and the like for a given town. Similarly, the databases of I skill improvement initiatives 212 program which provides details regarding the skills of existing workers within the town, whether the workers may be re-trained as needed, the training facilities within the town and the like. Furthermore, geographical data sources 214 such as geospatial satellite imagery of earth can be used to extract mapping data for identifying areas and distance processing in accordance with examples discussed herein. Further miscellaneous data sources 216 can databases of national or local governments regarding land ownership records, databases of infrastructure or other projects being undertaken, historical weather records, existing transportation modes including information regarding roadways, trains, busses and the like.

The real-time data sources 116 may include but are not limited to weather data 228 which can include the current weather conditions. This can be obtained from online data sources that are publicly available. In an example, the weather data may also be included in the historical data sources 114 which can be useful for generating the probable solutions 140. The real-time data sources can include hardware such as but not limited to current sensors 224, relays 222 and Raspberry Pi 226 which are simple computers used for teaching computers. Similar to the historical data, the real-time data may also be obtained from governmental data sources such as the geo-platform 230 provided by geospatial satellites. Each of the data sources mentioned herein may provide access via Application Programming Interfaces (API) 232 which may be proprietary or generic.

It can be appreciated that historical data sources 114 and real-time data sources 116 are shown separately for illustration purposes only and that it is possible for historical data sources 114 to store real-time data and conversely for the real-time data sources 116 to store historical data (at least for short time periods). In such instances, a data source may be classified as a historical data source and a real-time data source.

Figure 3A:
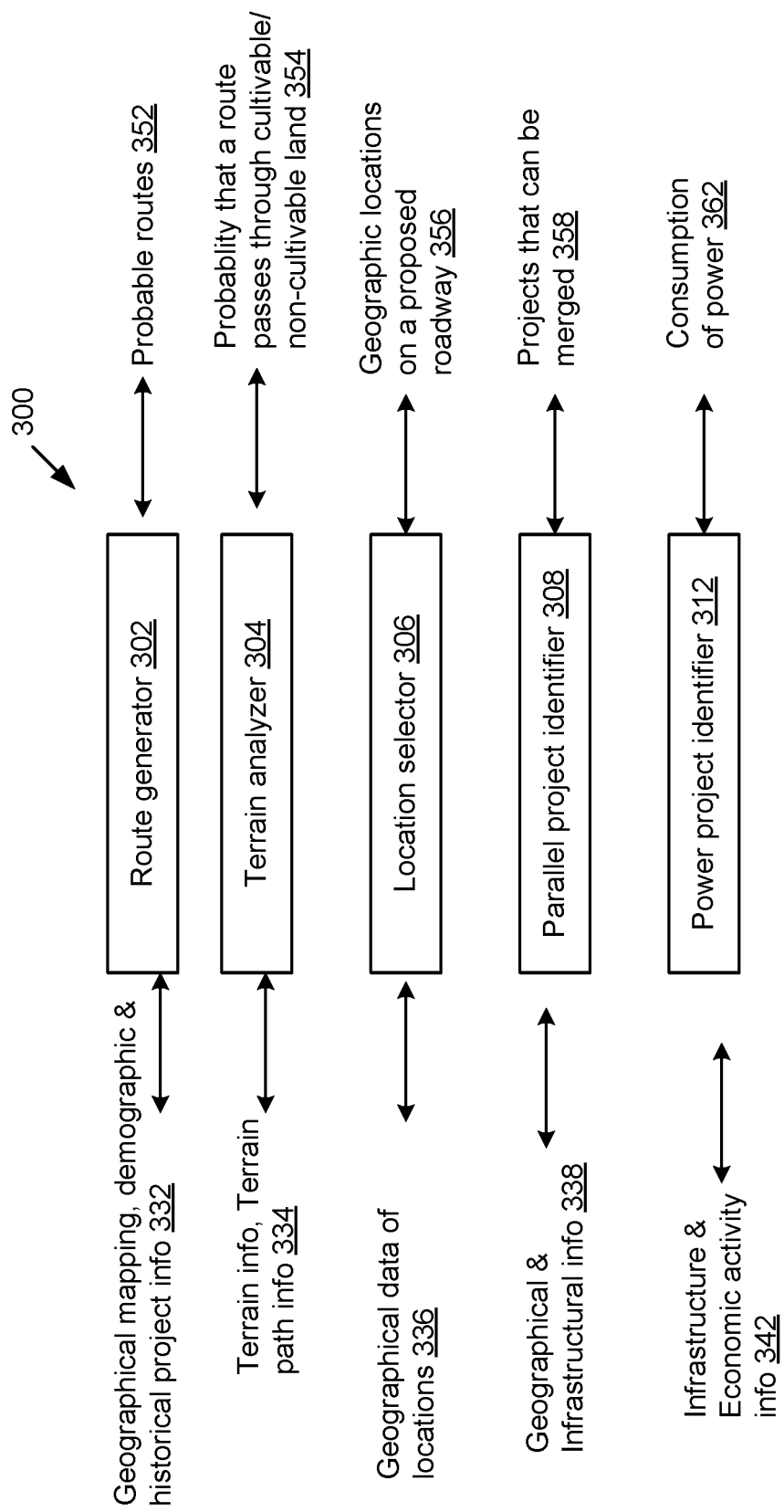
FIGS. 3A and 3B show a schematic diagram that lists certain example tasks and issues associated with the tasks that can be processed by the solution generator and planning system in accordance with the examples disclosed herein.
Figure 3B:
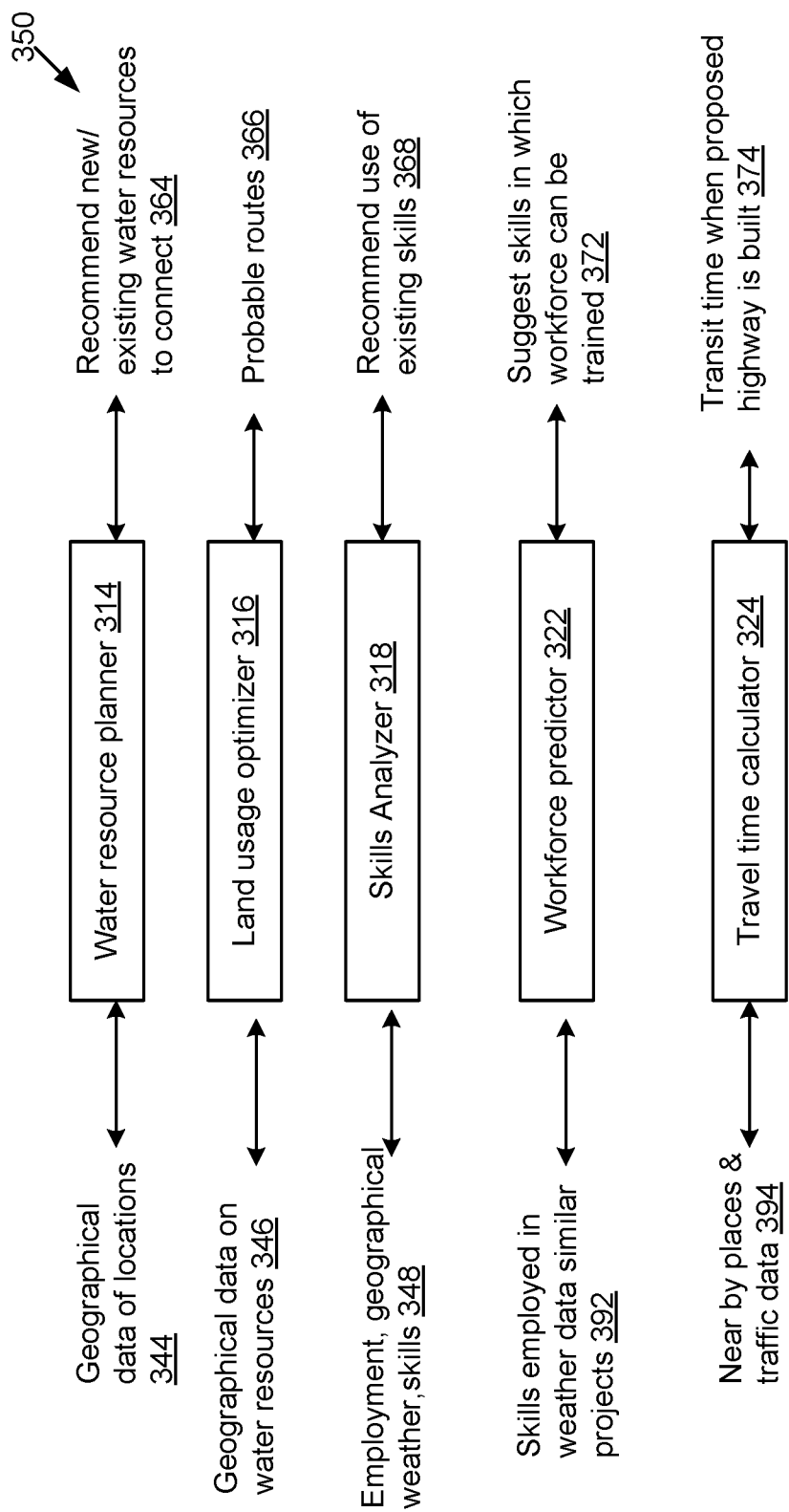

FIGS. 3A and 3B show a schematic diagrams 300 and 350 that list certain example tasks and task-related issues that can be processed by the solution generator and planning system 100. As mentioned above, based on the processing of the problem statement 120, word tokens are generated. The word tokens enable identifying an issue related to the project associated with the problem statement 120. Based on one or more of the categories 132 and the issue, the data input and data model(s) are selected for generating the probable solutions 140. Similar to the water resources example discussed above, the problem statement 120 can relate to a road construction project connecting two towns or geographic locations. The solution generator and planning system 100 can be configured to retrieve specific data related to each of the issues, analyze the issues using trained machine learning based data models 138 and provide options related to the issues. In an example, the probable solutions 140, which include possible routes along which a roadway can be laid between the two towns, can include options which are chosen as optimal based on priorities associated with multiple issues.

When the problem statement 120 relates to the roadway construction project, data 332 related to generating possible routes for the roadway is selected by the data selector 104 and one of the data models 138 which include a route generator 302 can generate possible routes 352 for the prospective roadway. The data selector 104 can select one or more of geographical mapping information, population demographics from public data sources such as Government census data, historical construction project data from public databases of governing bodies, land ownership data from land records and the like. The route generator 302 is selected from the data models 138 for obtaining the possible routes 352 by analyzing various issues and factors such as but not limited to, the population density, existing roads, terrain information, estimates of cultivable and non-cultivable lands, time and cost estimates of construction efforts and the like. The issues or factors that go into selecting one of the possible routes can be further analyzed by other data models of the plurality of data models 138 in accordance with examples disclosed herein. Moreover, each of the issues when relevant can provide an input in order to generate a time estimate for when the proposed roadway will be completed while factoring in the received inputs from different data models.

Some of the issues are discussed below for illustration purposes. It may be appreciated that all the issues discussed below need not be used to weigh the possible routes. Rather, one or more of the issues discussed below can be used to weigh the possible routes for the selection of the probable solutions 140.

One issue that can involve selection of one of the possible routes includes particular terrains through which the proposed roadway can pass through. One of the data models 138 can include a terrain analyzer 304 which receives as input data 334 including terrain information and terrain path information based on current satellite data along the various routes and the estimated distances along the route that the different terrains extend. The terrain analyzer 304 also gathers data from local government bodies regarding the agricultural belts along the various routes. By processing the input data 334, the terrain analyzer 304 can estimate a probability of a particular route passing through cultivable lands and fallow lands using averages based on the cropping data from the local government bodies. The terrain analyzer 304 can output an agriculture score 354 to provide the extent of cultivable and non-cultivable lands along a specific route. In an example, the output of the terrain analyzer 304 can be factored in by the options evaluator 108 when scoring the routes so that routes that minimize the use of agricultural or cultivable land can be scored higher than those that do not minimize the use of cultivable land for the road construction. The terrain analyzer 304 can be retrained periodically with the latest terrain information in order to produce accurate results.

The data models 138 can also include a location selector 306 that suggests towns or geographic locations 356 which can be connected by the proposed roadway. The location selector 306 implements an optimal distance classification methodology as detailed further herein that is trained on the geographical data including latitudes and longitudes 336 of various locations. The optimal distance classification algorithm divides the training data into a training set and a test set wherein the points within the training set are classified based on K nearest neighbor (KNN) methodology. In an example, the location selector 306 can suggest the locations 356 along a user-selected route from the probable solutions 140 that can be connected by the proposed roadway. In an example, the location selector 306 can provide similar suggestions of geographic locations that can be connected by each of the possible routes. The number and importance of the geographic locations that can be connected by the possible routes can be factored in for selecting the probable solutions 140 from the possible routes for by the options evaluator 108.

Identification for potential merging of other similar projects in the vicinity or in proximity to the proposed roadway can be another factor that determines evaluations of the possible routes. A parallel project identifier 308 is also included as one of the data models 138 for identifying other infrastructure projects that can be merged with the proposed roadway thereby saving time and expenses. The parallel project identifier 308 takes as input 338, the geographical mapping information 214, infrastructure information 206, land ownership data, information identifying projects being undertaken for improvement of civic amenities such as power, water, sewage and the like at locations proximate to the possible routes. In an example, the parallel project identifier 308 can implement the optimal distance classification algorithm (which is also employed by the location selector 306) to identify locations along a user selected route from the probable solutions 140 where the projects are being planned or executed. The parallel project identifier 308 therefore, recommends ongoing or planned projects 358 within the public databases that can be potentially merged with the proposed roadway. In an example, the parallel project identifier 308 can also identify projects that can be merged with the proposed roadway along each of the possible routes. Based, for example, on the time/cost savings from the merges, each of the possible routes can be evaluated by the options evaluator 108 in producing the probable solutions 140.

The plurality of data models 138 can also include a power project identifier 312 which accesses input data 342 from the infrastructure information 206, the geographical information 214, employment or economic activity data such as whether the activity relates to agriculture, small industries, consumer activity etc. from data sources such as national employment 208 and data from power boards and power companies where available, to identify amount of power available, any power shortfall at geographic locations along the possible routes. In particular, the power project identifier 312 can identify the power stations along a user selected route of the probable solutions 140 and calculate the consumption of power based on the economic activities. By comparing the power production data from the power boards and power companies and consumption estimates from the economic activities the power shortfalls can be determined. In an example, the power project identifier 312 can be configured to identify those routes in which no power transmission infrastructure exists. Accordingly, the power project identifier 312 can forecast additional power requirements 362 along the user-selected route. The power project identifier 312 can implement boosted decision tree regression algorithm. As mentioned above, the power project identifier 312 can also be used to identify power requirements along each of the possible routes. The probable solutions 140 can be selected by the options evaluator 108 based on the power requirements along the different possible routes.

As shown in FIG. 3B, the plurality of data models further include a water resource planner 314 for identifying water availability in areas along the user-selected route from the probable solutions 140. The water resource planner 314 can suggest options to address water deficits at one or more geographic locations along the user-selected route. The water resource planner 314 can receive as input data 344 from the geographical mapping data 214 and miscellaneous data sources 216, information regarding the water resources, ground water data, terrain information and data on existing water supply at towns along the user-selected route. In an example, the water resource planner 314 can implement a multi-class logistic regression algorithm for forecasting water required as per population, cultivable land, current water sources and water supply requirements. The water resource planner 314 can be further trained to match water requirements to known surplus water resources. Accordingly, the water resource planner 314 can provide recommendations 364 of new and existing water sources to fulfill the water requirements for towns along the user-selected route. In an example, the water resource planner 314 can be employed to similarly identify water requirements along each of the possible routes. The probable solutions 140 can be selected by the options evaluator 108 based on the fulfillment of water requirements along the different possible routes.

A land usage optimizer 316 is also included in the plurality of data models 138 for indicating the percentage of the land 366 to be used for the construction of the proposed roadway. The land usage optimizer 316 receives input data 346 including geographical data on water resources, ground water data, irrigation sources, crop data, fallow land data etc. for specific locations from one or more of the geographic mapping information data source 214 and miscellaneous data sources 216. Using one or more of the cropping data, water resources and ground water data and fallow land data, the land usage optimizer 316 can suggest one or more possible routes 366 that minimize the use of agricultural land for the construction of the proposed roadway. In an example, a two-class logistic regression algorithm is implemented by the land usage optimizer 316 to employ a combination of the cropping data and the output from the location selector 306 or the optimal distance classification algorithm to avoid construction on fertile land.

Another data model from the plurality of data models 138 includes a skills analyzer 318 which can integrate input data 348 including employment data with the geographic mapping information 214, weather information and skill requirement information to recommend 368 use of existing locally available skill pools to meet the workforce requirement in completing the local projects. The employment data is extracted from the public governmental databases at various levels including the national level to the state and local government level using unique ids. In an example, skill intensities representing the strength required for doing the work can be defined for each of the required skills on the construction project and for each of the available skills among the local workforce. For example, gradations such as very hard, hard, medium and gentle may be the skill intensities. The skill intensities between the required skills and available skills can be matched and the type of available skills can be identified. Similarly, the shortage of local workers among particular skill intensities also can be identified. In an example, the skills analyzer 318 can implement the decision forest algorithm to use data points to recommend use of locally available skill pools to meet the workforce requirements of the proposed roadway construction.

A workforce predictor 322 is also included in the plurality of data models 138 for analyzing skills of the local workforce and for suggesting 372 the required skills in which particular sections of the local workforce can be retrained for enabling usage of the local workforce on the proposed roadway project. The suggestions for retraining can be derived based on the skill intensity matches between the available skills and the required skills as analyzed by the skills analyzer 318. The workforce predictor 322 receives as input 392 details of skills employed in prior similar projects in the same or different geographical locations using the miscellaneous data sources 216, the weather data for the number of days available for the project duration, the current workforce local to the area of the proposed roadway, the required skills, the type of work involved and the like. The workforce predictor 322 implements, for example, two class decision tree and multiclass decision forest for providing the number of workers required and the type of skills needed to work on the proposed roadway.

In an example, the possible routes can be analyzed for the workforce and skills requirements by the workforce predictor 322 and the options evaluator 108 can evaluate each of the possible routes based on such requirements. The time and cost efficiencies as projected by the workforce predictor 322 can be factored in by the options evaluator 108 for shortlisting the probable solutions 140. The data of the workers and their skills from different regions can be updated on periodic basis and the workforce predictor 322 can be correspondingly updated.

In addition to identifying the nearby places to be connected to the proposed roadway, the plurality of data models 138 can also include a travel time calculator 324 that takes into consideration average time to travel to the nearby places identified by the location selector 306. The travel time calculator 324 receives as input 394, the nearby places, traffic data from the nearby places, average time to travel between the nearby places. Based at least on the received input, the travel time calculator 324 can extrapolate the traffic data and travel times of the nearby places and compare it with the average speed per vehicle to arrive at the expected times to transit 374 and distances between combinations of the nearby towns when the proposed roadway is built. In an example, the travel time calculator 324 can implement ML Boosted decision tree regression and linear regression algorithms. In some examples, web services can provide traffic inputs periodically to update the travel time calculator 324 with the latest updates.

The specific data models are discussed above by the way of illustration only. Other data models can also be employed in accordance with other examples in order to implement the solution generator and planning system 100 as discussed herein.

Figure 4:
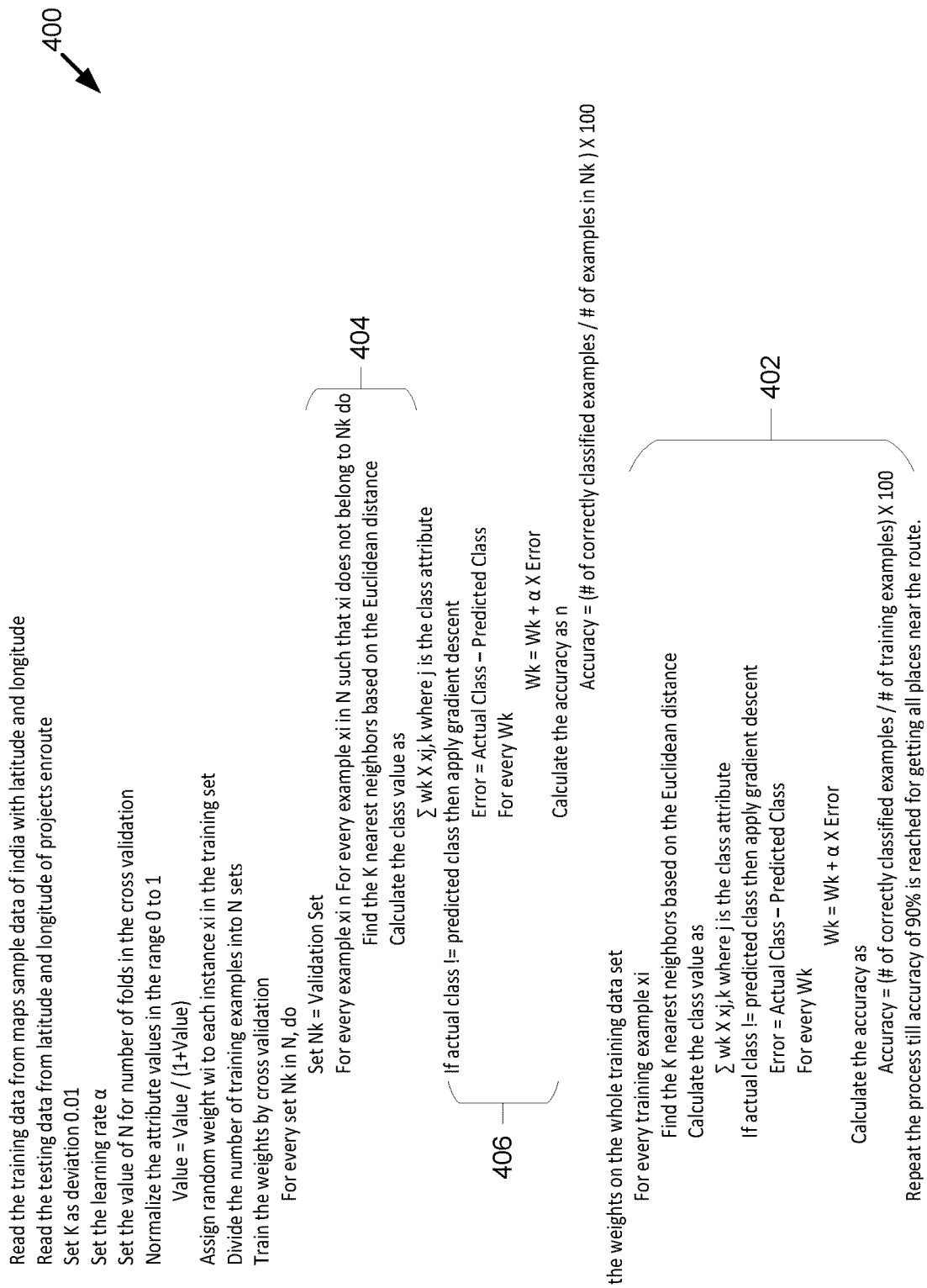
FIG. 4 shows the details of the optimal distance classification methodology in accordance with examples disclosed herein.

FIG. 4 shows the details of the optimal distance classification methodology 400 in accordance with examples disclosed herein. The methodology begins with reading training data which can include mapping data of the country where the proposed roadway is to be built. The mapping data can include latitude and longitudes of the various geographical locations within the country. The testing data which also includes the latitudes and longitudes of the various geographical locations associated with different projects along a given possible route of the proposed roadway is also accessed. In an example, the testing data can also include the two geographic locations which are to be connected via the proposed roadway. A deviation of +0.01 or −0.01 is employed in the latitudes and longitudes along the possible route for identifying the nearby places that can be potentially connected. A learning rate of alpha (α) is set for accurate identification of the nearby places. While α may be arbitrarily set at the beginning when the optimal distance classification methodology is initially employed, constant uses of the methodology can help in refining and identifying more accurate values of α.

The attribute values in the training set are normalized to lie within the range of 0 to 1. Random weight wi is assigned to each instance xi in the training set. Let N be the number of folds in the cross validation and the examples in the training set are divided into N sets. The weights are trained by cross validation as shown at 402. For each set Nk in N sets and for each xi in N which does not belong to Nk, the K nearest neighbors based on the Euclidean distance are obtained at 404 which are suggested as the nearby geographic locations that can be connected by the proposed roadway. The accuracy of the classification is also estimated as shown at 406.

Figure 5:
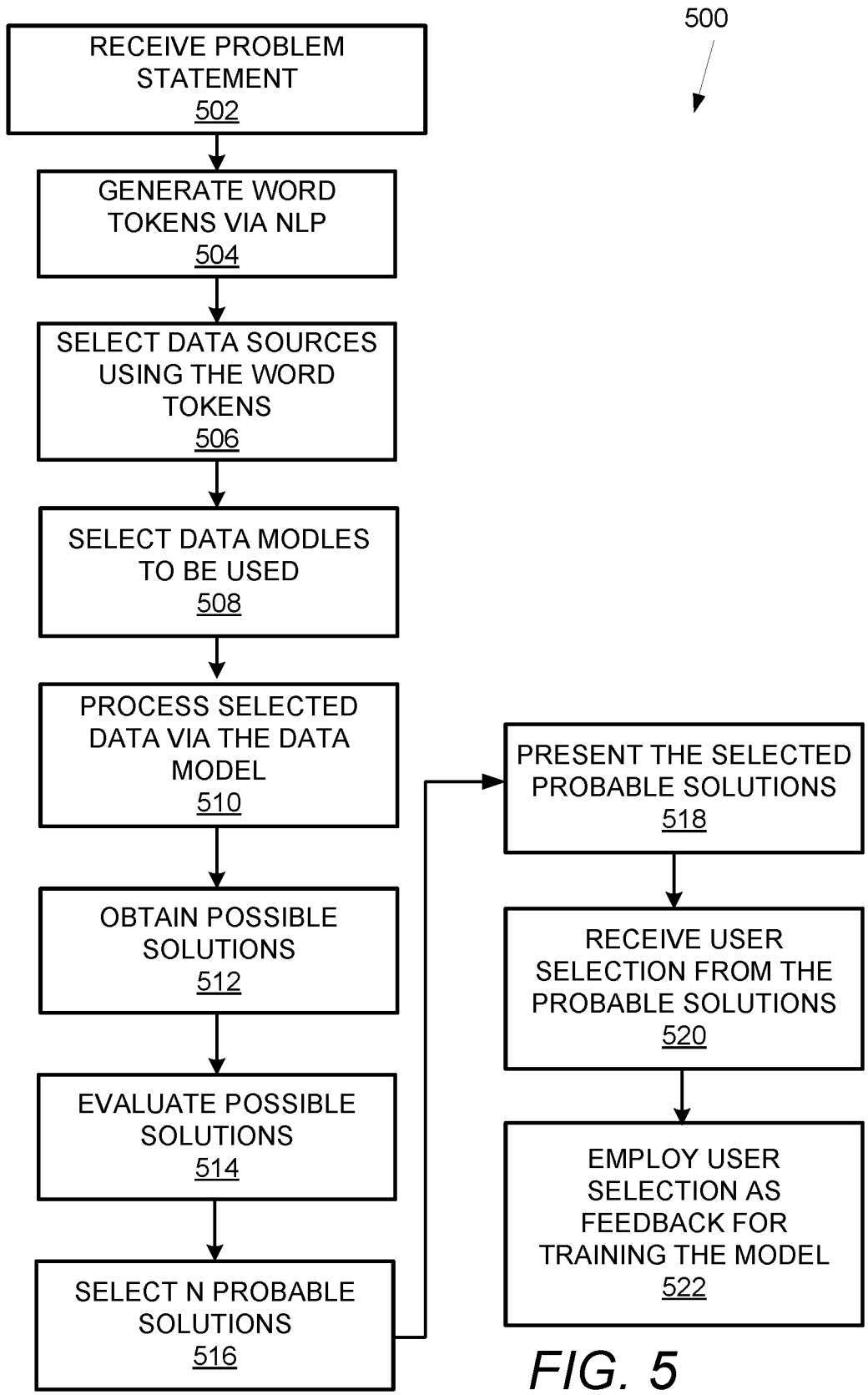
FIG. 5 shows a flowchart that details a method of providing possible solutions to particular user-generated problem statements in accordance with examples discussed herein.

FIG. 5 shows a flowchart 500 that details a method of providing probable solutions to particular problem statements received from users in accordance with examples discussed herein. In an example, the problem statements can pertain to the tasks to be executed such as construction of the proposed roadway. The various discrete data sources 114, 116 which include public and private data sources which may include historical data and real-time data. The data models 138 are initially constructed with the data extracted from the various discrete data sources. The data may be processed via cleaning and transforming procedures into a homogenous data format prior to building the data models 138. By the way of illustration and not limitation, based at least on the selected data and the expected output of a data model, tools such as Machine Learning Studio may be employed to build the data models 138. Techniques such as but not limited to logistic regression, K Nearest Neighbors (KNN) and Support Vector Machines (SVM) may be employed for building the data models 138.

When the data models 138 are built and trained, the solution generator and planning system 100 can receive problem statements regarding one or more issues at 502. A received problem statement 120 can be processed for example, by parsing and obtaining word tokens at 504 that enable the selection of relevant data sources 114, 116 and specific data fields at 506 from the data sources 114, 116. In an example, the word tokens can include entities which include identifying indicia related to the task to be executed. Referring to the example of the proposed roadway, the entities can include at least the geographical locations that the proposed roadway connects. Other entities can include those pertaining to the issues involving the task. For example, the other entities can include geographical locations along a possible route that are being analyzed for one of the issues. The issues may further relate to merging of projects, power resource or water resource analysis, identifying workforce etc.

The tokens further enable selection of at least one of the plurality of ML data models 138 at 508. More particularly, different ML data models can be trained to produce probable solutions for different issues. In an example, the data models 138 can be trained to identify data dependencies and detect trends in the data based on one or more of the training data 134 and the feedback data 136. Additionally, the data models 138 may also learn to weigh differently the various factors as gleaned from the data fields when proposing the probable solutions 140. For example, a particular data model can be trained to analyze infrastructure data 206 and tourism data 204 thereby identifying a trend that a popular tourist spot on the proposed roadway lacks proper infrastructure and that there are no infrastructure projects being planned. Accordingly, the geographic location associated with such as tourist spot can receive higher weight with respect to tourism issue. Similarly, the geographic location can also be weighted with respect to other issues and a probable solution including a route servicing the tourist spot would consider a cumulative weight of the tourist spot with respect to various issues that the plurality of ML data models 138 are trained to analyze. A plurality of possible solutions are thus put forth by the selected data models 138 based on the interrelationships and weights of the various factors affecting the issue(s) referred to by the problem statement 120. In generating the possible solutions, the solution generator and planning system 100 can produce new data elements. For example, a data element related to existing infrastructure projects at the tourist spot can be generated by one of the ML data models 138. Such data element related to the infrastructure project at the tourist spot may be absent from both the infrastructure data 206 and the tourism data 204.

Based again on one or more of the training data 154 and feedback data 156, the possible solutions are evaluated at 514 in terms of their efficiencies in addressing one or more issues referred to by the problem statement 120. Out of the various possible solutions, the solution generator and planning system 100 may be configured to select the top N possible solutions which can be termed as the probable solutions 140 at 516 where N is a natural number so N=1, 2, 3 . . . . When presented at 518 with the N probable solutions via an output user interface associated with the solution generator and planning system 100, a user may select one of the probable solutions 140. The user selection from the probable solutions 140 is received at 520 and may be employed at 522 as feedback data for fine tuning the data model provider 106.

Figure 6:
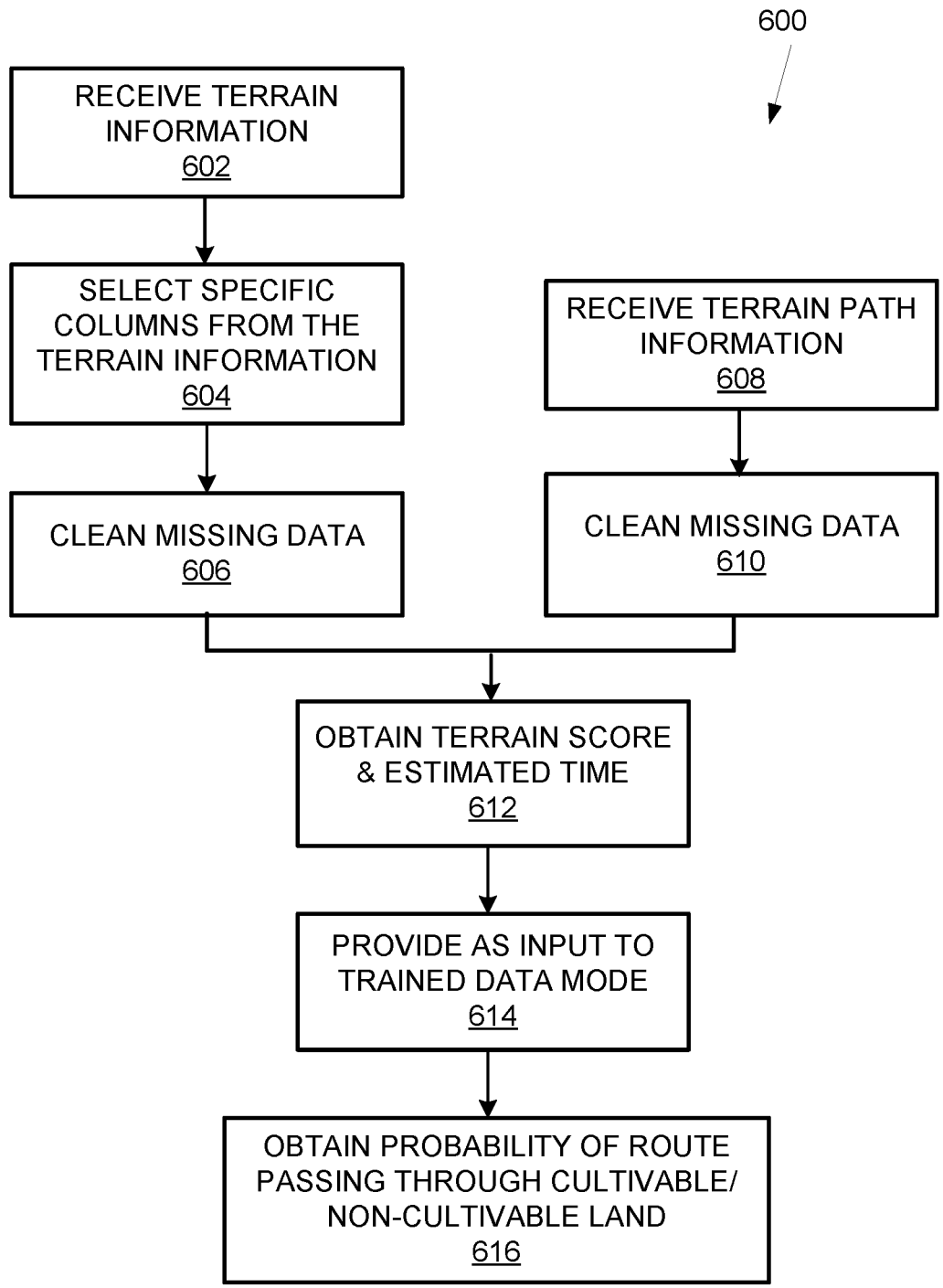
FIG. 6 shows a flowchart that details a method of analyzing one of the issues and providing possible solutions based on the issue in accordance with examples disclosed herein.

FIG. 6 shows a flowchart 600 that details a method of analyzing one of the issues and providing probable solutions based on the issue in accordance with examples disclosed herein. For example, the issue can relate to estimating time to build based on satellite data of a selected route. At 602, the terrain information based on satellite imagery information is received. In an example, the terrain analyzer 304 may receive input from the location selector 306 to create a terrain info output file which can be a spreadsheet or other textual file. So the terrain info file includes the geographic locations that the specific route under analysis is servicing, the corresponding information regarding the various terrain types encountered and the area under each terrain type. Various terrain types may be included such as plains, plateaus, mountains, river banks, deserts etc. Specific columns of the terrain info file can be selected at 604 and the missing data is cleaned at 606.

The terrain path info is received at 608 and can include the extent of cultivable and non-cultivable land extracted from the miscellaneous data sources 216 along the specific route. The missing data is cleaned at 610 and a terrain score that suggests possible terrain that can be encountered during the construction of the specific route and approximate time required for the construction within the terrains is obtained at 612 using the inputs from the terrain info file and the terrain path info file. The data obtained at 612 is fed to the trained data model represented by the terrain analyzer 304 at 614. The probability or the extent of the specific route that is expected to pass through cultivable land and non-cultivable land is obtained at 616. The terrain analyzer 304 further estimates the time it would take to build the proposed roadway based on the terrains associated with the selected route.

Figure 7:
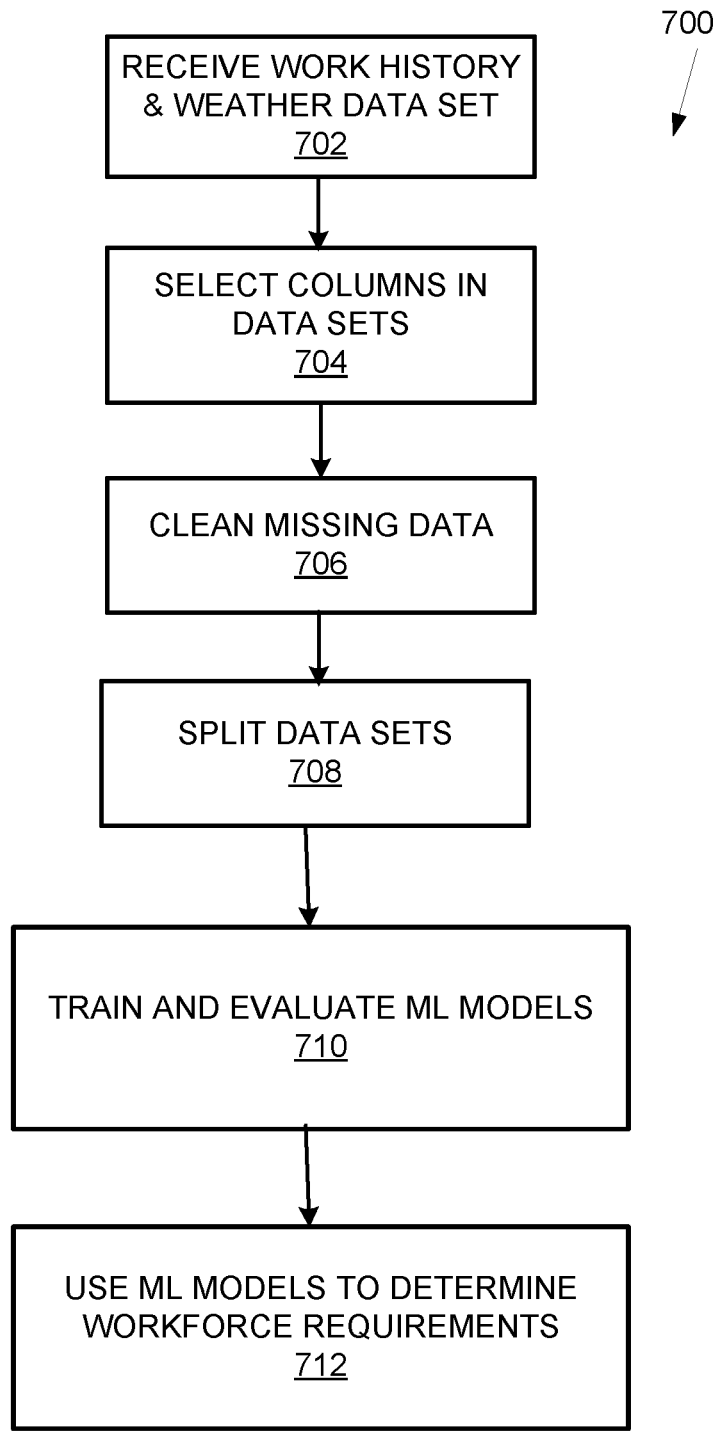
FIG. 7 shows a flowchart that details a method providing possible solutions in accordance with examples disclosed herein.

FIG. 7 shows a flowchart 700 that details that details a method of analyzing one of the issues based on data extracted from at least two of the discrete data sources and providing probable solutions based on the issue in accordance with examples disclosed herein. More particularly, the issue can relate to identifying workforce for the proposed roadway in accordance with examples disclosed herein. The method begins at 702 wherein the work history and the weather data sets are received. The work history and available employees within a region local to a specific route of the proposed roadway can be retrieved from employment databases such as employment databases 208 and skill improvement initiatives 212. The historical weather data can be obtained from geo-platforms and similar resources. The columns in the workforce and the weather datasets are selected at 704. The missing data in the datasets is cleaned at 706. The datasets are split at 708 and the respective ML models are trained and evaluated at 710. The output from the trained ML models is employed to determine the workforce requirements at 712 for the proposed roadway construction project as outlined herein.

Figure 8:
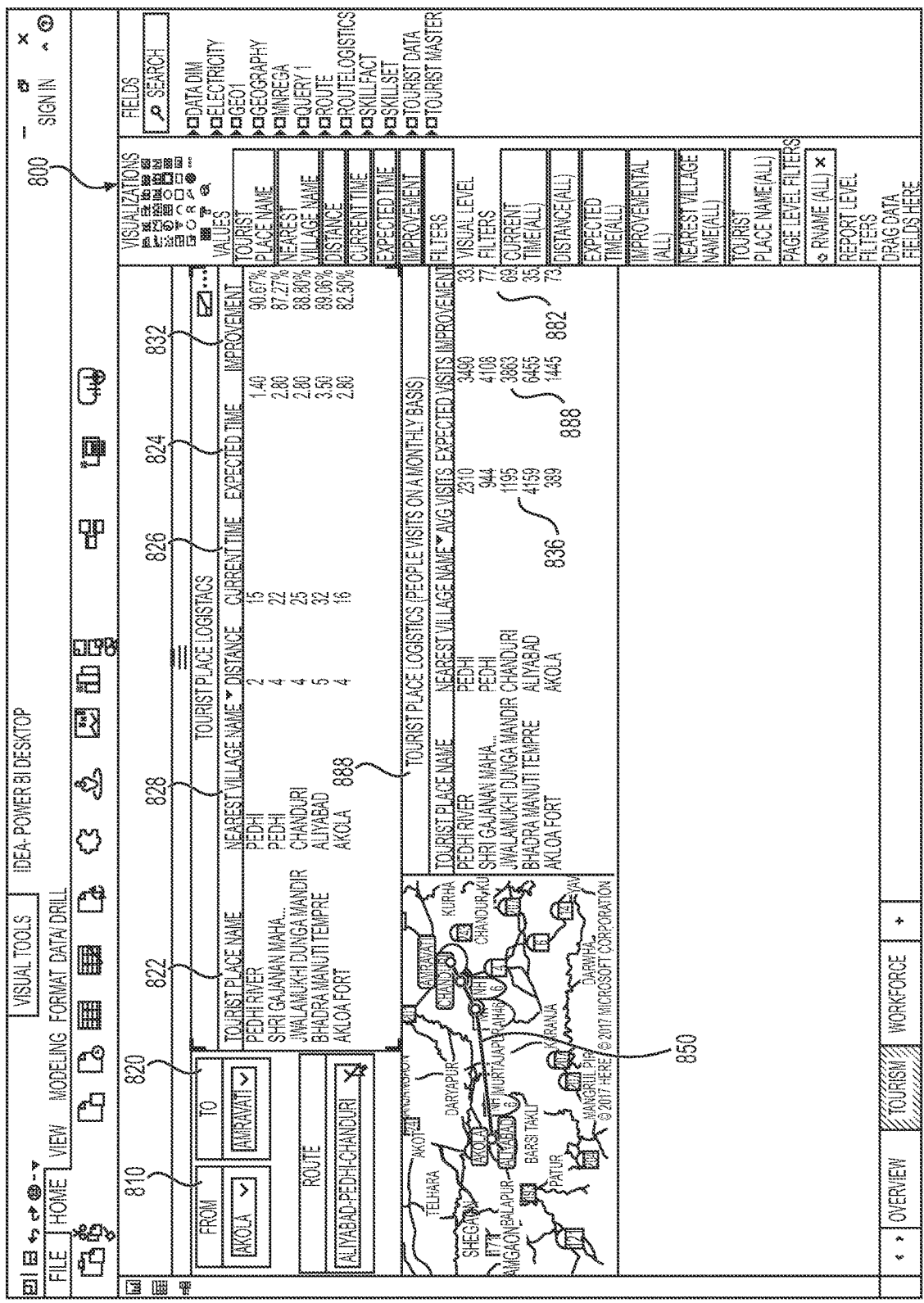
FIG. 8 shows a tourism user interface (UI) in accordance with examples disclosed herein.

It may be noted that the work history and the weather datasets are retrieved from discrete and public databases and may not have the requisite data needed for generating the projections of workforce or time periods necessary for an infrastructure project associated with the problem statement. Accordingly, various machine learning models are trained using historical data related to various processes (e.g., infrastructure projects) and various sub-processes (issues) to produce data elements needed for generating the projections that are employed for the successful execution of the projects. In an example, ML models such as the multi-class decision forest can be used for processing the work history information. In an example, ML models such as two-class decision forests can be employed for the analysis of the weather data. For each of the geographic locations along the route being analyzed, the two-class decision forest model provides the number of working days available for work on the proposed roadway based on the weather data. The multi-class decision forest model provides the number of workers available within each of the geographic locations on the selected route, the nature of the work performed by the workers, the strength required (e.g., very hard, hard, medium, gentle) for performing the work and the like. The inputs from the two data models analyzing the work history data set and the weather data set, is employed to calculate the number of working days and the number of people available. The inputs from the data models is also employed in obtaining the additional workforce needed to complete the proposed roadway, the additional workforce that can be mobilized and the time period in which the proposed roadway can be completed given the workforce that can be mobilized and the number of working days (e.g., annually) available to the work force FIG. 8 shows a tourism user interface (UI) 800 that depicts one of the probable solutions to a problem statement from a user regarding an optimum route for the proposed roadway between two towns, namely, Akola 810 and Amravati 820. Two factors or issues as shown by a tourism tab 812 and a workforce tab 818 were selected for calculating the optimal route for laying a road between the two towns 810 and 820 where none previously existed. A route 850 is one of the possibilities suggested by the solution generator and planning system 100 based on the tourist and workforce data gathered from prior road construction projects which was used to train the data model provider 106. In addition, the prospective improvements in the tourism factor that caused the data model provider 106 to suggest the route 850 for constructing the road are also displayed. The names of the tourist places 822 and the nearest village names 828, the current travel times 826 and the expected travel times 834 if the road along the route 850 were to be constructed and the percentage improvements 832 are displayed on the tourism user interface (UI) 800 when the tourism tab 812 is selected. Similarly, tourist place logistics data which includes current data and the projected data were the road along the route 850 to be constructed is also displayed. The tourist place logistics can include the current average visits 836, the expected visits 838 and the improvements 882 after the road is constructed are also estimated and displayed.

Figure 9:
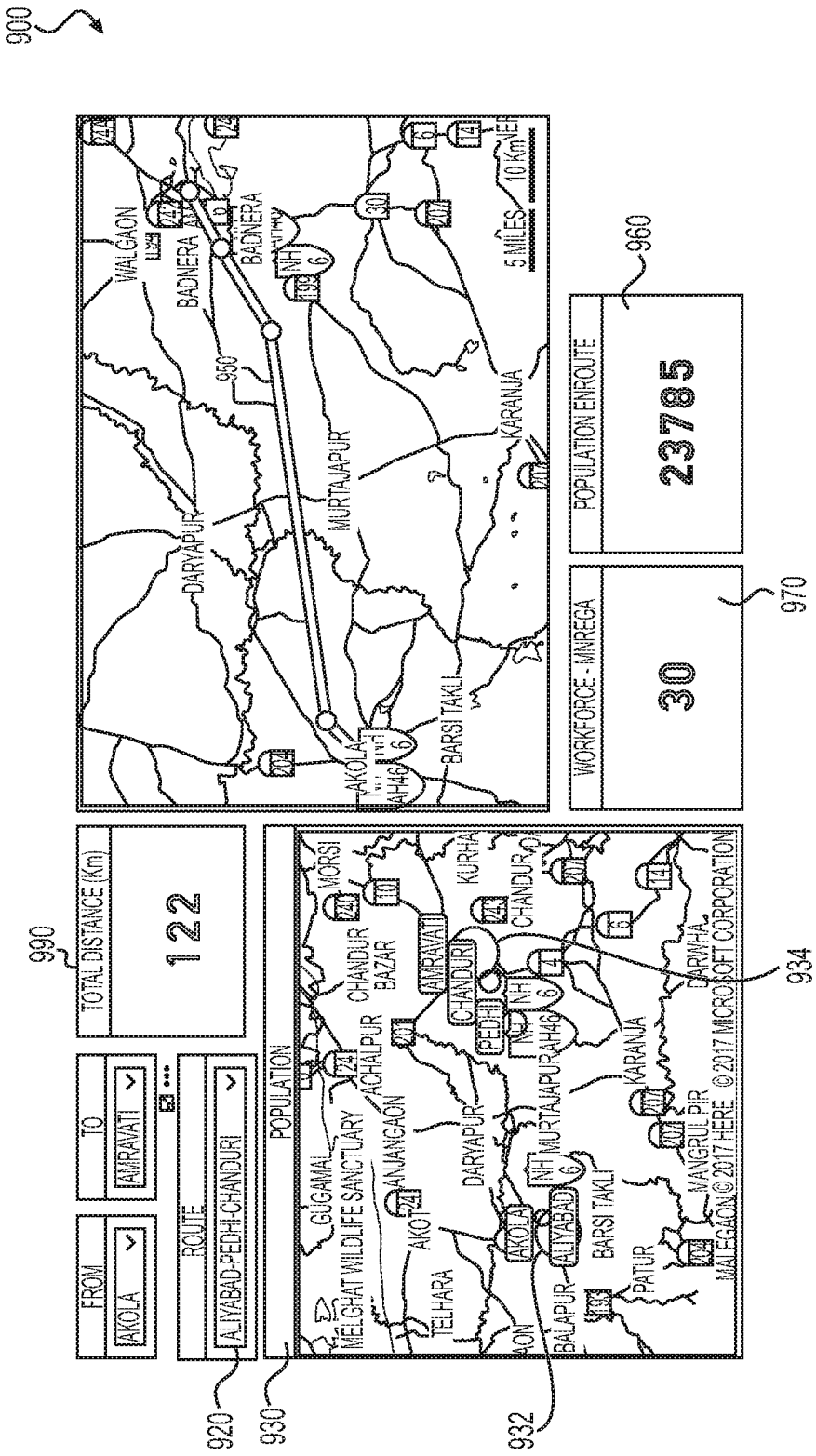
FIG. 9 shows an overview UI in accordance with examples disclosed herein.

FIG. 9 shows an overview user interface 900 configured to display information such as the population density of the towns using for examples symbols such as the circles 932, 934 wherein a larger circle can be indicative of greater population density. Based on the data from the data sources 114 and 116, the solution generator and planning system 100 can suggest a few routes that are feasible to construct a road between the towns 810 and 820. The route 990 is identified as Aliyabad-Pedhi-Chanduri route 920 based on the tourist places en-route with a distance of 122 Km. As mentioned supra, some of the factors that caused the solution generator and planning system 100 to suggest the route 990 can include the population en route 960 and the workforce 970 as obtained from the national employment 208 data source. It can be appreciated that only two factors are shown and described herein for brevity and that any number of pertinent factors can be analyzed for a given issue by the data model provider 106 when proposing the probable solutions 140. If selected during the review stage 150, a road will be constructed along the route 990 connecting Akola and Amravati. The solution generator and planning system 100 will continue to receive real-time data during the construction of the road so that future recommendations of other road construction proposals may be fine-tuned based on the merit of the proposed route 990.

Figure 10:
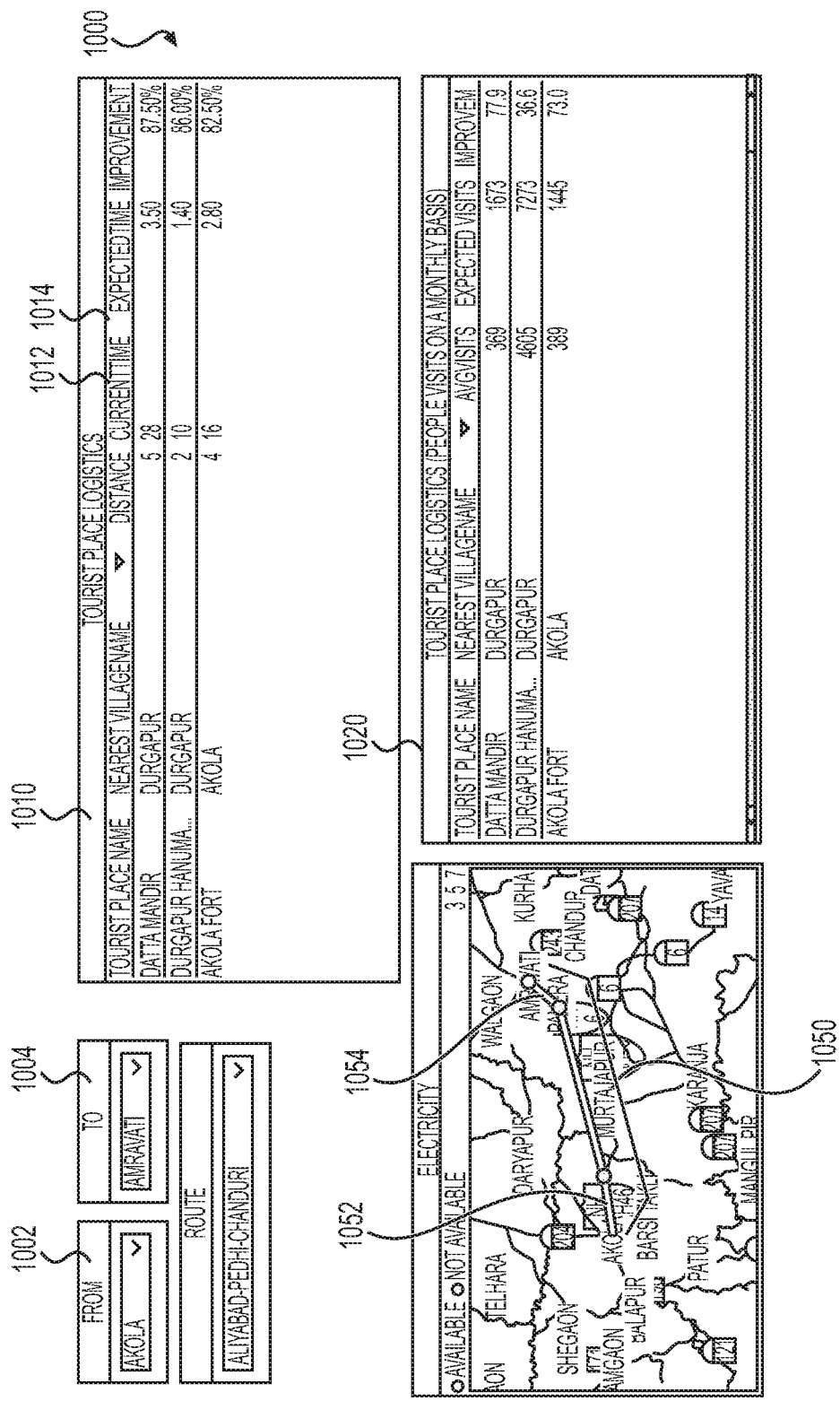
FIG. 10 shows a view which displays an alternate proposed route for laying the road between the towns in accordance with examples disclosed herein.

FIG. 10 shows a view 1000 which displays another suggested possibility or an alternate proposed route 1050 for laying the road between the towns 1002 and 1004. The alternate proposed route 1050 is labeled as "Anvi-Durgapur-Fejarpura" based on the towns encountered when traversing along the alternate proposed route 1050. In an example, the towns may have been selected by the town selector based on one or more issues. Similar to the overview user interface 900, the tourist place logistics 1010, 1020 along the alternate proposed route 1050 are also shown. Based on the data extracted from the data sources 114, 116, the current times 1012 and the expected times 1014 when the alternate proposed route 1050 is built are shown. However, it may be noted that the view 1000 also shows the status of power infrastructure or availability of electricity along the alternate proposed route 1050. It may be noted that a major part 1052 of the alternate proposed route 1050 is shown in red which indicates that the power infrastructure may need to be improved while the smaller portion 1054 of the alternate proposed route 1050 is indicated in green as having adequate power infrastructure. Therefore, a suggestion for further projects or for combining establishing power infrastructure such as laying electric lines along with constructing the road may be suggested by the solution generator and planning system 100. In a further example, the alternate proposed route 1050 may score less than the route 950, if the route 950 has adequate power infrastructure all through.

Figure 11:
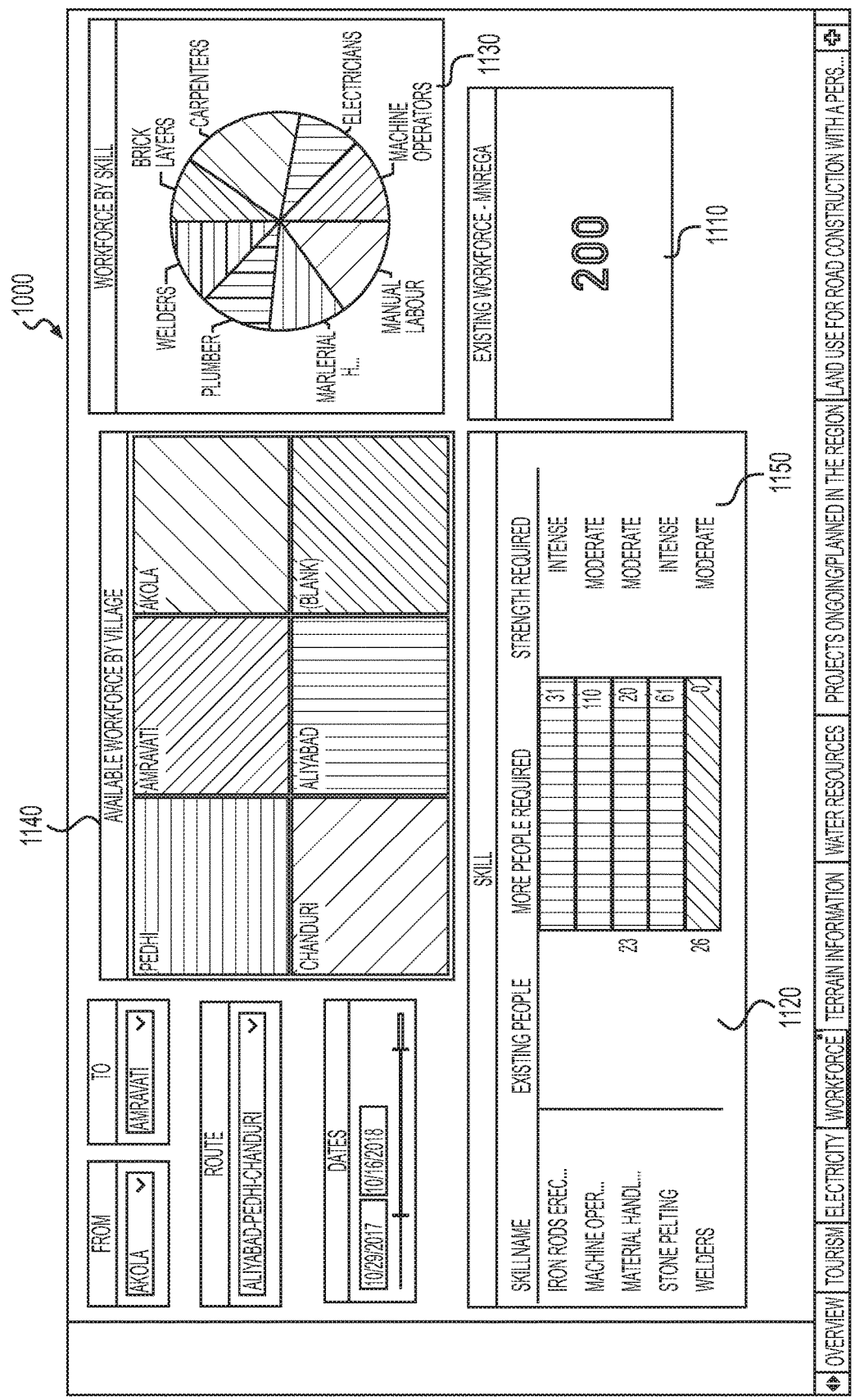
FIG. 11 shows a view that is displayed when the workforce tab is selected in accordance with examples disclosed herein.

FIG. 11 shows a view 1100 that is displayed when the workforce tab is selected for an alternate proposed route. It shows the existing work force 1110 from an employment database, number of skilled people 1120 in each of the trades such as welders, machine operators, brick layers and the like. The statistics shown at 1120 are also displayed as a pie diagram 1130 while the available workforce by village is shown via the infographic 1140. As mentioned supra, availability of local workforce can be a factor in selecting a route for road construction as utilizing local talent results in cost savings and faster execution of the construction projects. The strength required column 1150 shows the strength required for the different types of work as derived by, for example, the multi forest decision ML model by analyzing the workforce data.

Figure 12A:
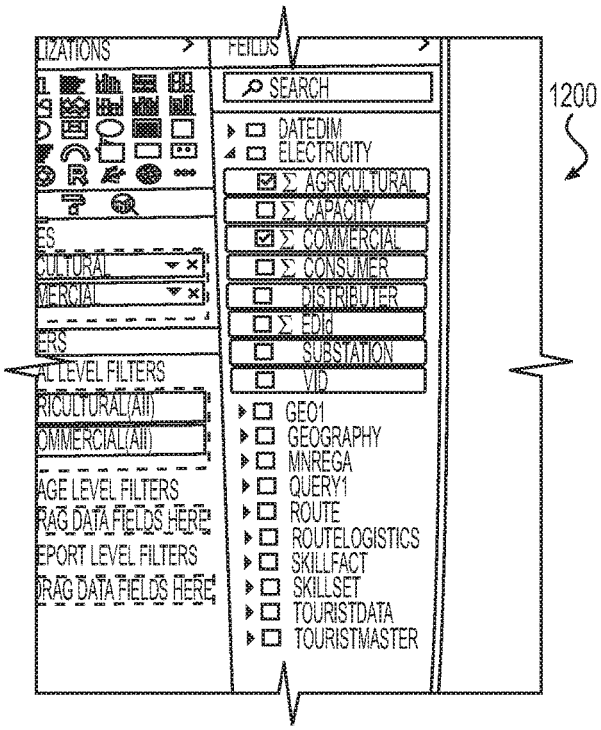
FIGS. 12A, 12B and 12C show the various factors that can be considered for rating possible routes in accordance with examples disclosed herein.
Figure 12B:
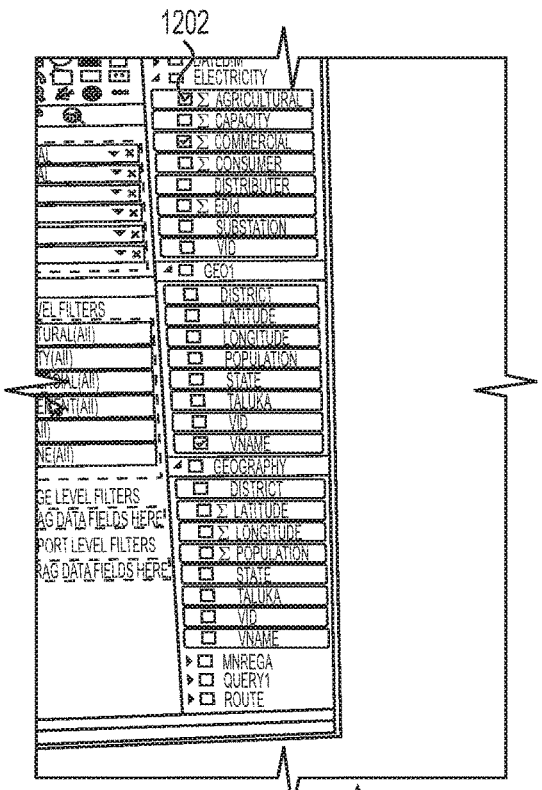
Figure 12C:
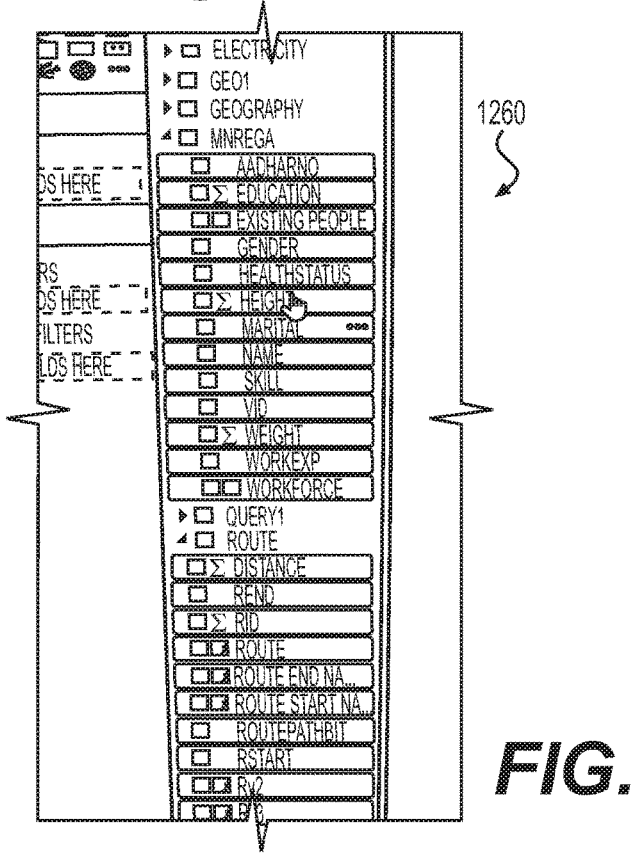

FIGS. 12A, 12B and 12C show the various factors that can be considered for rating possible routes for a road between two towns. In an example, the factors to be considered can be selected by the user via the user interface (UI) elements such as the checkbox 1202. It can be appreciated that the FIG. 12A shows a view 1200 of the data fields that can be included in the analysis when data related to usage of electricity for agricultural, commercial and consumer purposes etc. is used by the data models 138. The data fields include, the capacity along the route included in one of the probable solutions for the road construction project, the number of agricultural, commercial establishments, the number of consumers and distributions, the sub-stations and the like.

FIG. 12B shows the geographic data 1250 that is accessible to the solution generator and planning system 100. It includes the district, latitude, longitude, population, state and the like.

FIG. 12C shows a view 1260 the data available in the employment databases 208. These can include education, existing number of people or workers willing to relocate, capacity for manual labor, skills, work experience and the like. In addition the route attributes are also selected such as the distance and the like.

Figure 13:
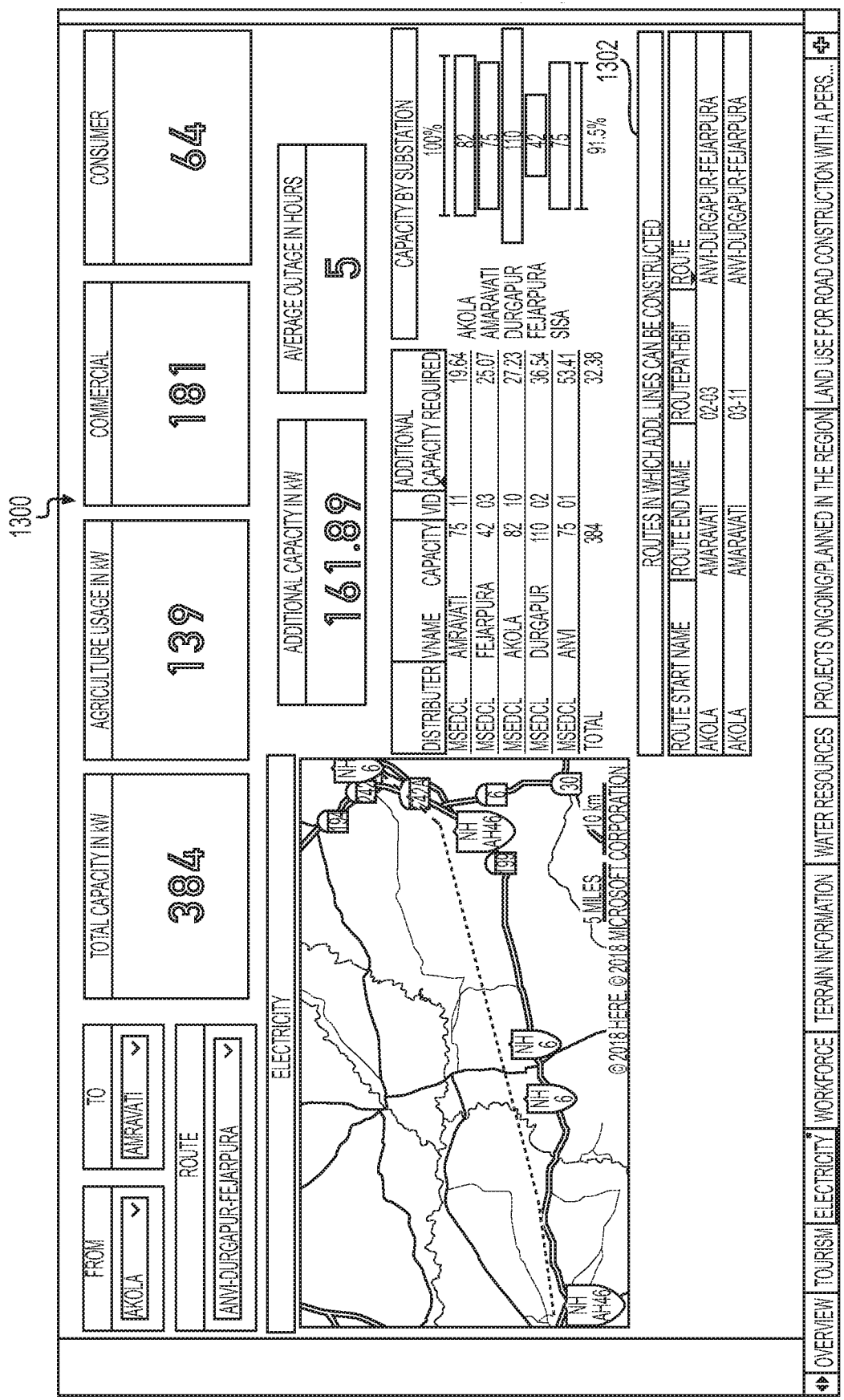
FIG. 13 shows a power UI associated with the power project identifier in accordance with examples disclosed herein.

FIG. 13 shows a power user interface (UI) 1300 associated with the power project identifier 312 in accordance with examples disclosed herein. Based at least on the various metrics associated with the power availability such as power usages for various purposes including total capacity, agricultural, commercial, consumer, additional capacity and the like, the possible routes in which additional lines can be constructed 1302 on the proposed roadway from Akola to Amravati are identified by the power project identifier 312 and displayed.

Figure 14:
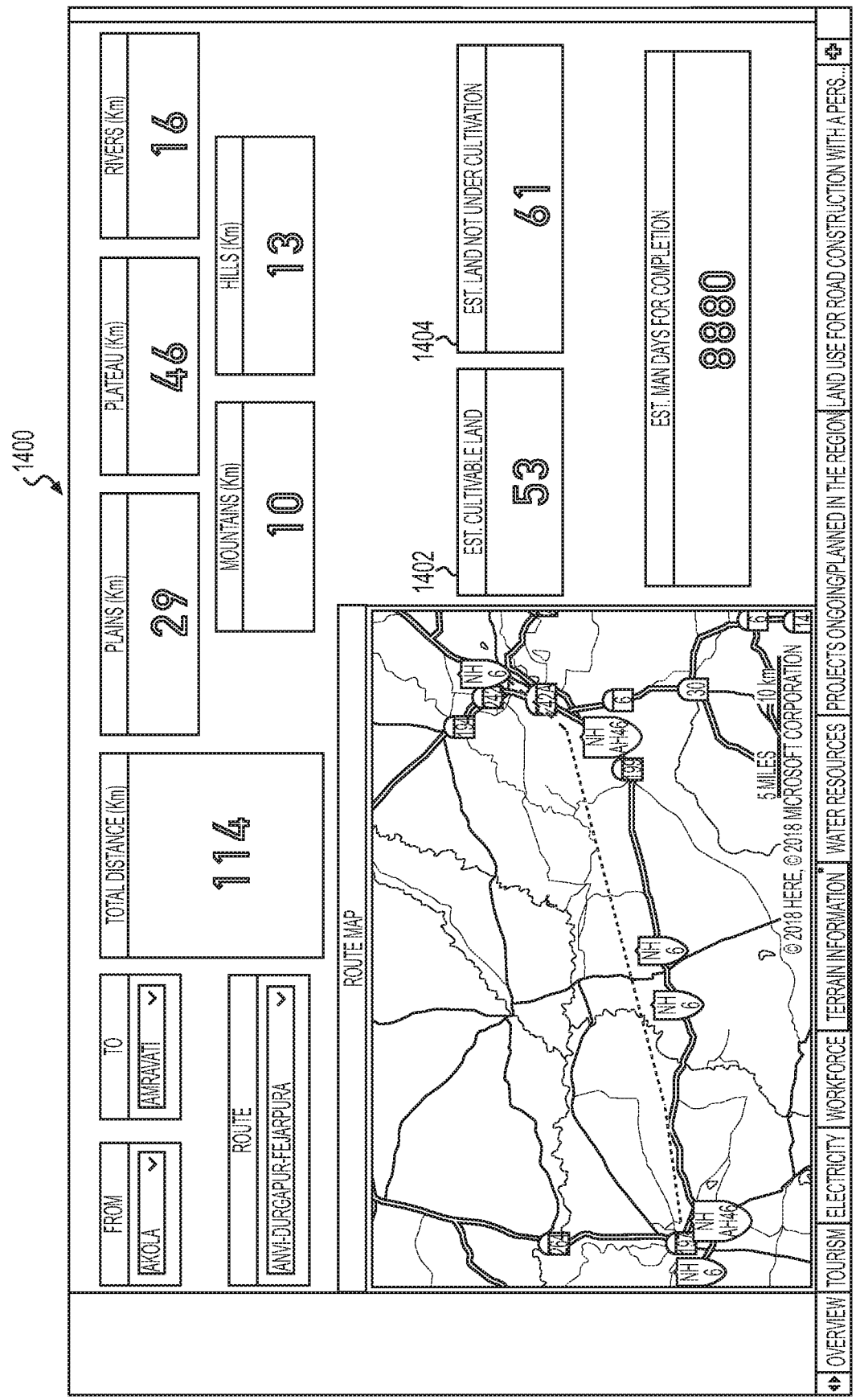
FIG. 14 shows a terrain UI that displays the terrain information in accordance with examples disclosed herein.

FIG. 14 shows a terrain UI 1400 that displays the terrain information in accordance with examples disclosed herein. Again, the terrain data for the proposed roadway from Akola to Amravati on the Anvi-Durgapur and the Ferjapur route is displayed. The terrain data includes the number of kilometers that different terrain types such as plains, plateaus, rivers, hills and mountains extend on the total distance of 114 kilometers of the route. In addition, the estimated cultivable land 1402 and the land not under cultivation 1404 are derived by the terrain analyzer 304 as detailed herein.

Figure 15:
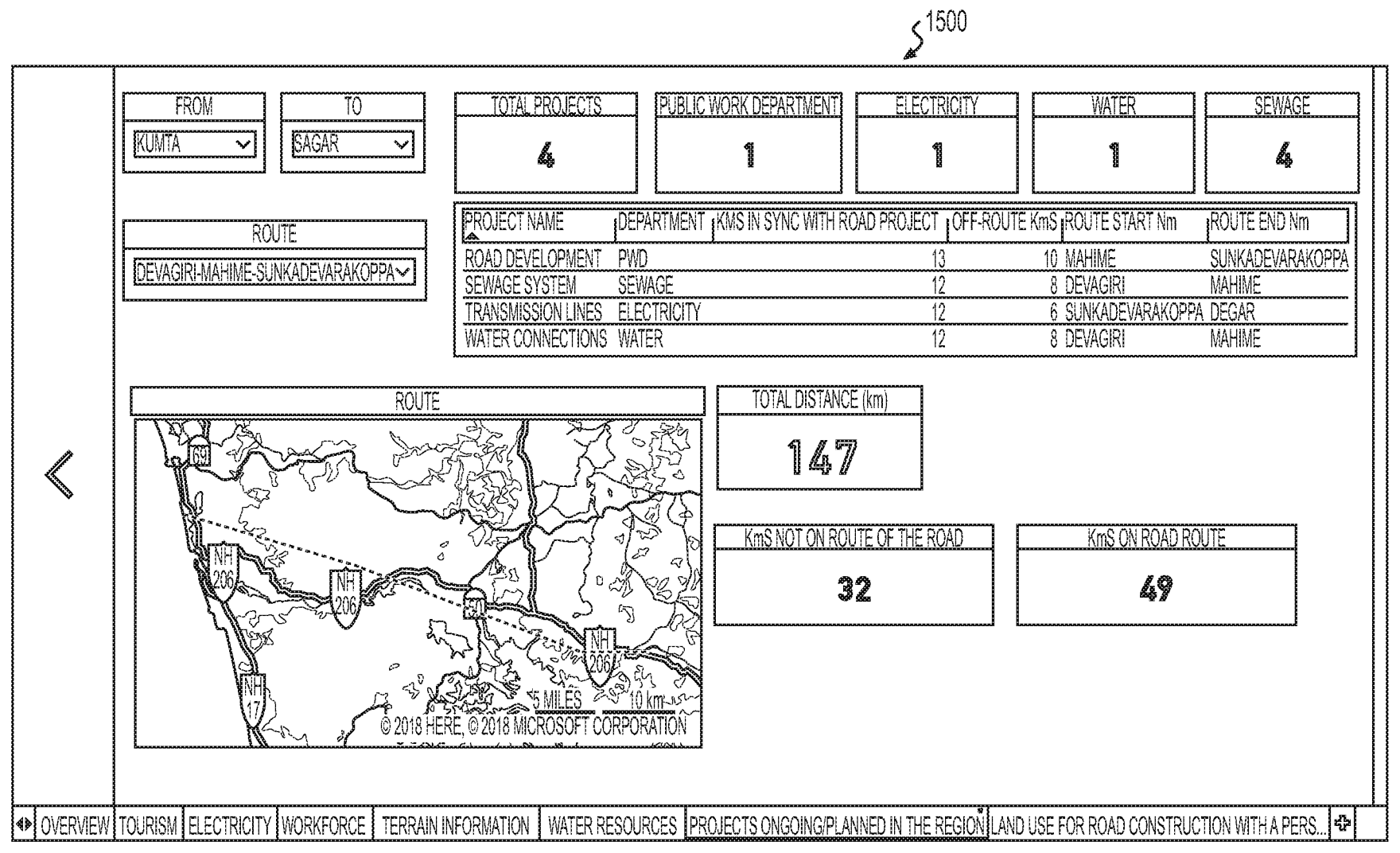

FIG. 15 shows a projects UI 1500 in accordance with the examples disclosed herein. The projects UI 1500 shows the various projects under different categories which are being executed on a given route and can be considered for potentially merging with a proposed roadway from Kumta to Sagar. The number of kilometers of the route that coincide with the project sites and the number of kilometers that the projects are off the route are also shown.

Figure 16:
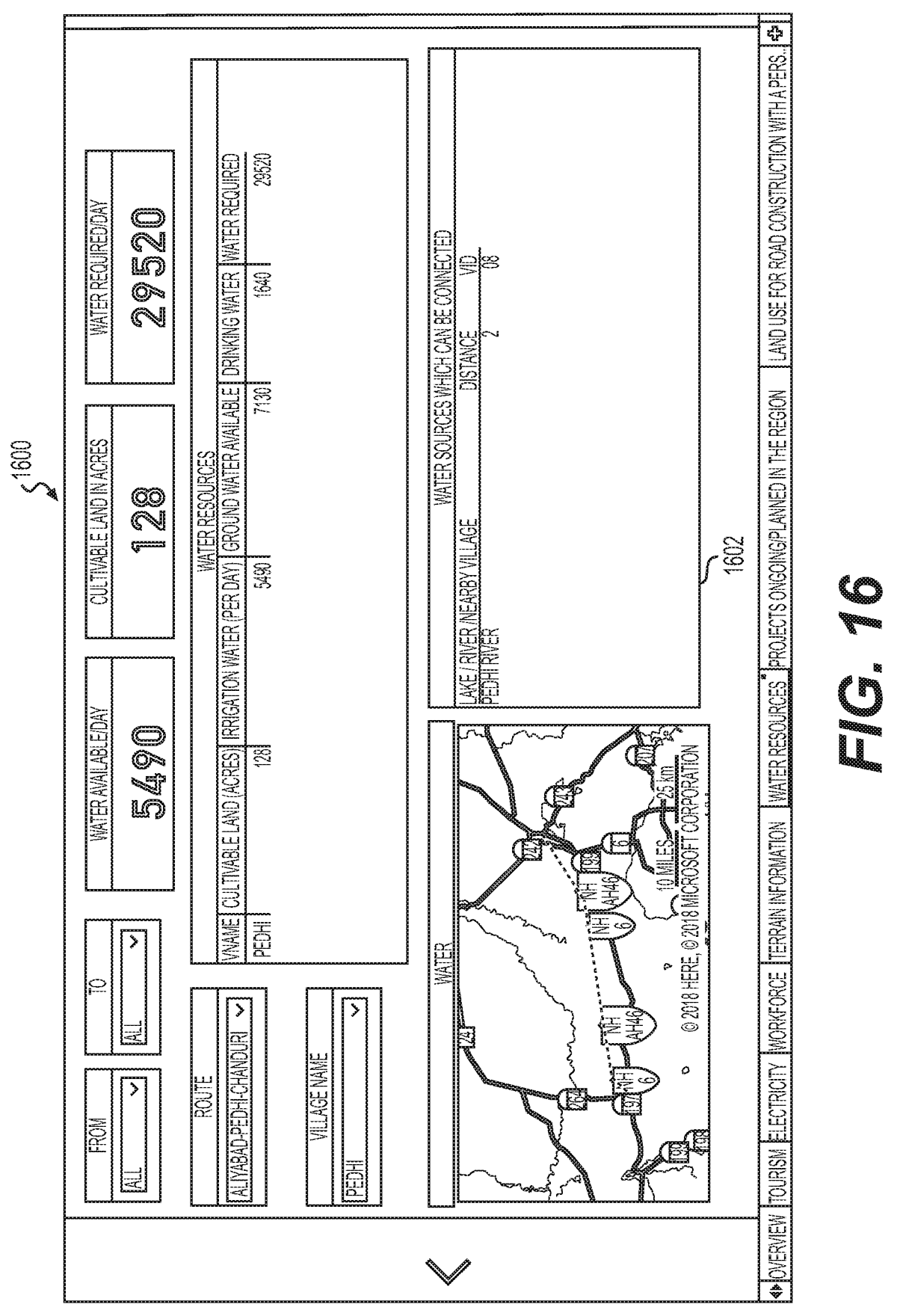

FIG. 16 shows a water resources UI 1600 that is generated in accordance with the examples disclosed herein. The water resources UI 1600 shows the details of the water availability and based on an analysis of the water requirements, the shortfall in water supply can be determined. The water resource identifier determines, for example, from the geographical mapping information 214 including satellite imagery, the availability of water resources 1602 that can be connected to fulfill the need for water supply within the region.

Figure 17:
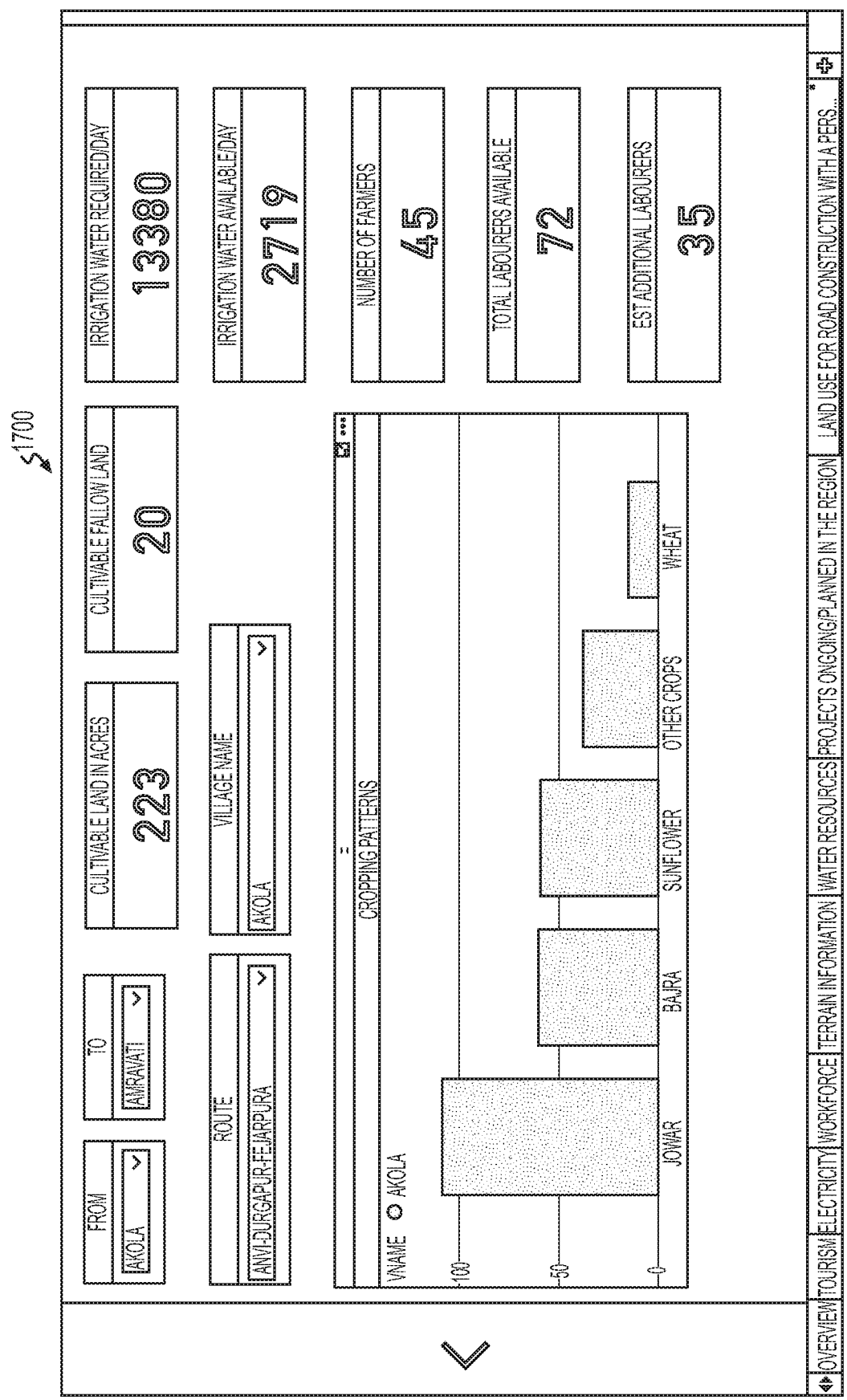
FIG. 17 shows a UI that displays the details of cropping patterns generated in accordance with the examples disclosed herein.

FIG. 17 shows a UI 1700 that displays the details of cropping patterns within the region of the proposed roadway in accordance with the examples disclosed herein. Based on the cropping patterns and the cultivable and fallow lands, the possible routes which minimize the use of cultivable lands can be selected by the options evaluator. Additional details such as water availability and availability of laborers are also displayed on a specific route for the proposed roadway.

Figure 18:
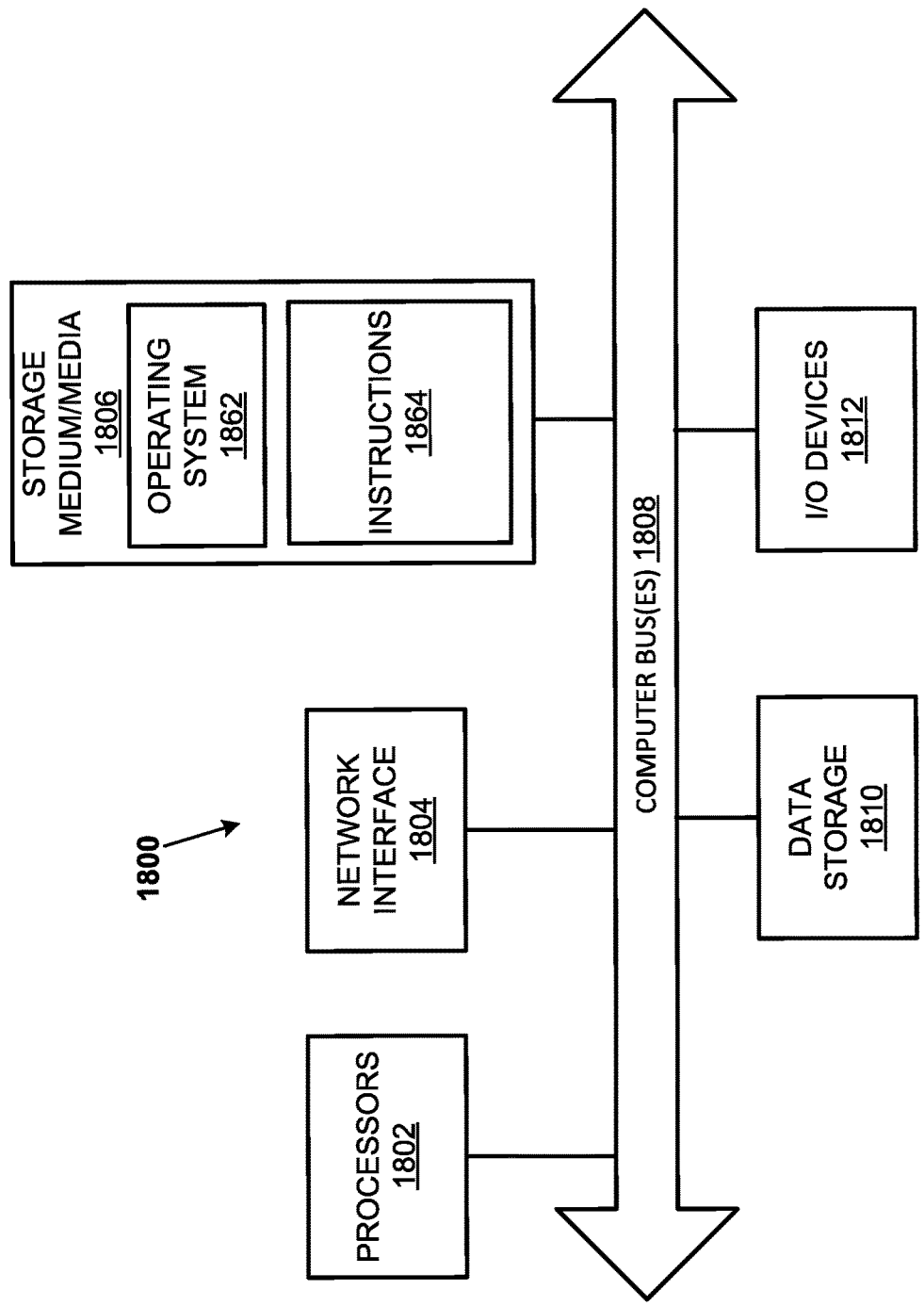
FIG. 18 illustrates a computer system that may be used to implement the solution generator and planning system in accordance with the examples disclosed herein.

FIG. 18 illustrates a computer system 1800 that may be used to implement the solution generator and planning system 100. The computer system 1800 may include additional components not shown and that some of the components described may be removed and/or modified.

The computer system 1800 includes processor(s) 1802, such as a central processing unit, ASIC or other type of processing circuit, input/output devices 1818, such as a display, mouse keyboard, etc., a network interface 1804, such as a Local Area Network (LAN), a wireless 802.x LAN, a 3G or 4G mobile WAN or a WiMax WAN, and a computer-readable medium 1806. Each of these components may be operatively coupled to a bus 1808. The computer-readable medium 1806 may be any suitable medium which participates in providing instructions to the processor(s) 1802 for execution. For example, the computer-readable medium 1806 may be non-transitory or non-volatile medium, such as a magnetic disk or solid-state non-volatile memory or volatile medium such as RAM. The instructions or modules stored on the computer-readable medium 1806 may include machine readable instructions 1864 executed by the processor(s) 1802 to perform the methods and functions for solution generator and planning system 100. The computer-readable medium 1806 may also store an operating system 1862, such as MAC OS, MS WINDOWS, UNIX, or LINUX. The operating system 1862 may be multi-user, multiprocessing, multitasking, multithreading, real-time and the like. For example, during runtime, the operating system 1862 is running and the instructions 1864 are executed by the processor(s) 1802.

The computer system 1800 may include a data storage 1810, which may include non-volatile data storage. The data storage 1810 stores any data used by the solution generator and planning system 100. The data storage 1810 may be used to store real-time data or processed historical data, new data elements which are created by the data models 138 and which may be used by the solution generator and planning system 100.

The network interface 1804 connects the computer system 1800 to internal systems for example, via a LAN. Also, the network interface 1804 may connect the computer system 1800 to the Internet. For example, the computer system 1800 may connect to web browsers and other external applications and systems via the network interface 1804.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims, and their equivalents, in which all terms are meant in their broadest reasonable sense unless otherwise indicated.

What is claimed is:

1. A natural language processing (NLP) based solution generation and planning system comprising:
at least one processor;
a non-transitory computer readable medium storing machine-readable instructions that cause the at least one processor to:
receive a problem statement from a user, wherein the problem statement relates to a plurality of issues associated with construction of a proposed roadway between at least two geographic locations;
determine, based at least on NLP, the at least two geographic locations associated with the proposed roadway;
extract data from a plurality of discrete data sources based at least on the plurality of issues and using word tokens generated from the problem statement via NLP;
select, multiple Machine Learning (ML) data models of a plurality of ML data models for analysis of the extracted data, the selection of the multiple ML data models is based on the problem statement and the plurality of issues and each ML data model analyzes the extracted data corresponding to one issue of the plurality of issues associated with the construction of the proposed roadway;
generate a plurality of possible routes based on the extracted data using the multiple ML data models, the multiple ML data models being built based on training data from the plurality of discrete data sources;
evaluate the plurality of possible routes with respect to the plurality of issues included in the problem statement;
obtain a plurality of probable routes for the proposed roadway from the evaluation of the possible routes;
enable display of the probable routes on a user interface that includes a plurality of tabs, wherein each tab corresponds to one issue of the plurality of issues and selection of the tab from the plurality of tabs displays data that caused the ML data model corresponding to the issue associated with the tab to generate one or more of the plurality of probable routes;
receive via the user interface, a user selection of a probable route from the plurality of probable routes; and
update at least one of the multiple ML data models based on real-time data obtained by monitoring implementation of the selected probable route.

2. The NLP based solution generation and planning system of claim 1, wherein the plurality of discrete data sources include public sources for geographical mapping information, population demographics, land ownership and historical construction project records.

3. The NLP based solution generation and planning system of claim 1, wherein the machine-readable instructions for obtaining the plurality of probable routes comprise further instructions that cause processor to:
generate one or more optimal routes for the proposed roadway connecting the at least two geographic locations.

4. The NLP based solution generation and planning system of claim 1, wherein the machine-readable instructions for generating the plurality of possible routes comprise further instructions that cause processor to:
read the training data and testing data from mapping information stored on one of the plurality of discrete data sources, the mapping information including latitudes and longitudes of geographic locations along the proposed roadway; and
assign random weights to each instance representing a place associated with a latitude and longitude pair.

5. The NLP based solution generation and planning system of claim 4, wherein the machine-readable instructions for generating the plurality of possible routes comprise further instructions that cause processor to:
divide a set of training examples into N sub-sets, where N is a natural number greater than or equal to 1;
train the weights by cross validation, wherein the cross validation includes:
for each of the instances in the set of training examples that do not belong to a selected sub-set:
find K nearest neighbor instances based on Euclidean distance, where K is an integer greater than or equal to 1; and output the K nearest neighbor instances as suggested nearby geographic locations that can be connected by the proposed roadway.

6. The NLP based solution generation and planning system of claim 5, wherein the machine-readable instructions for generating the plurality of possible routes comprise further instructions that cause processor to:
identify other projects that can be potentially merged with a project of the proposed roadway based at least on the suggested nearby geographic locations connected to the proposed roadway.

7. The NLP based solution generation and planning system of claim 5, wherein the machine-readable instructions for generating the plurality of possible routes comprise further instructions that cause processor to:
extract terrain data for regions between the at least two geographic locations from one or more of the plurality of discrete data sources;
identify possible terrains that can be encountered during construction of the plurality of possible routes for the proposed roadway from the terrain data; and
determine an approximate time period for construction of the plurality of possible routes based on one of the possible terrains.

8. The NLP based solution generation and planning system of claim 5, wherein the machine-readable instructions for generating the plurality of possible routes comprise further instructions that cause processor to:
select a decision tree model from the plurality of ML data models;
analyze the mapping information using the decision tree model; and
obtain prospective driving times for each of the plurality of possible routes based on the analysis.

9. The NLP based solution generation and planning system of claim 5, wherein the plurality of discrete data sources include data sources of power companies and the machine-readable instructions comprise further instructions that cause processor to:
extract at least the data pertaining to amount of power available at the nearby geographic locations from the data sources associated with the power companies;
select a boosted decision tree regression model from the plurality of ML data models;
analyze the data from the data sources of the power companies using the boosted decision tree regression model; and
forecast, based on the analysis of by the boosted decision tree regression model, additional power requirements at geographic locations along a selected route to be constructed for the proposed roadway.

10. The NLP based solution generation and planning system of claim 5, wherein the plurality of discrete data sources include geographical mapping data sources storing information regarding water resources proximate to the plurality of possible routes and the machine-readable instructions comprise further instructions that cause processor to:
extract at least the data pertaining to quantity of water available at the nearby geographic locations from the geographical mapping data sources;
select a multi-class logistic regression model from the plurality of ML data models;
analyze the data from the geographical mapping data sources using the multi-class logistic regression model; and
forecast, based on the analysis of by the multi-class logistic regression model, additional water requirements at geographic locations along a selected route to be constructed for the proposed roadway.

11. The NLP based solution generation and planning system of claim 1, wherein the plurality of discrete data sources include geographical data sources storing information regarding water resources, irrigation data and crop data in areas proximate to the plurality of possible routes and the machine-readable instructions comprise further instructions that cause processor to:
extract at least cropping data at specific locations proximate the routes;
select a two-class logistic regression model from the plurality of ML data models for analyzing the cropping data;
identify cultivable lands and non-cultivable lands along each of the routes based on the analysis of the cropping data by the two-class logistic regression model; and
score each of the plurality of possible routes for the proposed roadway; and
identify based on the score, one of the plurality of possible routes that minimize use of the cultivable lands as an optimal route for the proposed roadway.

12. The NLP based solution generation and planning system of claim 1, wherein the plurality of discrete data sources include labor data, geographical mapping data and skill requirements for the proposed roadway, and the machine-readable instructions comprise further instructions that cause processor to:
extract from the plurality of discrete data sources, available skills and required skills information at specific time points for completion of the proposed roadway for regions surrounding the plurality of possible routes;
select a decision forest model from the plurality of ML data models for analysis of the extracted information; and
identify candidates with the available skills from the regions to work on the proposed roadway based on the analysis.

13. The NLP based solution generation and planning system of claim 12, wherein the machine-readable instructions for suggesting employees comprise further instructions that cause processor to:
obtain skill intensities of each of the required skills and for each of the available skills; and
suggest new skills for retraining the identified candidates based on matches of the skill intensities of the required skills with the skill intensities of the available skills.

14. The NLP based solution generation and planning system of claim 1, wherein the plurality of discrete data sources include labor data, geographical data and skill requirements for the proposed roadway, and the machine-readable instructions comprise further instructions that cause processor to:
extract from the plurality of discrete data sources, available skills and available candidates information for regions surrounding the plurality of possible routes and historical data from prior projects;
select a two class decision tree model and a multi class decision forest model from the plurality of ML data models for analysis of the extracted information; and
determine number of required employees and required skills to work on the proposed roadway based on the analysis.

15. A method of generating solutions to problem statements comprising:

receiving a problem statement associated with a task to be executed and the problem statement including one or more entities associated with the task;

obtaining word tokens from the problem statement using natural language processing (NLP) technique, the word tokens referring to one or more issues related to the task, wherein the task includes construction of a proposed roadway and the one or more entities include at least two geographic locations between which the proposed roadway is to be constructed;

identifying, using the word tokens, one or more relevant data sources of a plurality of discrete data sources, the relevant data sources storing data related to the one or more issues;

extracting, transforming and loading relevant data from the relevant data sources into local data stores, wherein the relevant data is stored in the local data stores in a homogenous data format and the relevant data being selected based on the word tokens;

selecting multiple Machine Learning (ML) data models of a plurality of ML data models for analysis of the extracted data, the selection of the multiple ML data models is based on the task and the one or more issues and each ML data model analyzes the extracted data corresponding to one issue of the one or more issues associated with the construction of the proposed roadway;

providing the selected ML data models with the entities including the at least two geographic locations from the problem statement and the relevant data from the local data stores;

obtaining, from the selected ML data models a plurality of possible solutions responsive to the problem statement and related to the issues, the plurality of possible solutions including generation of a plurality of possible routes between the at least two geographic locations;

selecting top N results of the plurality of possible solutions as probable solutions for presentation to a user, the selection of top N results based on evaluation of the plurality of possible solutions and wherein N is a natural number and wherein the probable solutions include a plurality of probable routes between the at least two geographic locations;

enabling a display of the plurality of probable routes on a user interface that includes a plurality of tabs, wherein each tab of the plurality of tabs corresponds to one issue of the one or more issues and selection of the tab displays data that caused the ML data model corresponding to the issue associated with the tab to generate one or more of the plurality of probable routes;

receiving via the user interface, user selection of one of the probable solutions for implementation in executing the task; and updating the trained multiple ML data models and the relevant data in the local data stores based on feedback received from execution of the task associated with construction of the proposed roadway.

16. The method of claim 15, further comprising:
evaluating the plurality of possible solutions based on one or more attributes associated with the issues.

17. A non-transitory computer-readable storage medium comprising machine-readable instructions that cause a processor to:

receive a problem statement associated with a task to be executed and the problem statement including one or more entities associated with the task, wherein the task includes construction of a proposed roadway and the one or more entities include at least two geographic locations between which the proposed roadway is to be constructed;

obtain word tokens from the problem statement using natural language processing (NLP) technique, the word tokens referring to one or more issues related to the task;

identify, using the word tokens, one or more relevant data sources of a plurality of discrete data sources, the relevant data sources storing data related to the one or more issues;

extract, transforming and loading relevant data from the relevant data sources into local data stores, wherein the relevant data is stored in the local data stores in a homogenous data format and the relevant data being selected based on the word tokens;

select multiple machine learning trained (ML) data models from a plurality of ML data models for producing one or more solutions related to the task, wherein each ML data model of the multiple ML data models is trained to analyze the relevant data corresponding to one issue of the one or more issues associated with the construction of the proposed roadway;

provide the selected, trained ML data models with the entities including the at least two geographic locations from the problem statement and the relevant data from the local data stores;

obtain, from the selected, trained ML data models, a plurality of possible solutions responsive to the problem statement and related to the one or more issues, the plurality of possible solutions including generation of a plurality of possible routes between the at least two geographic locations;

select top N results of the plurality of possible solutions as probable solutions for presentation to a user, the selection of top N results based on evaluation of the plurality of possible solutions and wherein N is a natural number and wherein the probable solutions include a plurality of probable routes between the at least two geographic locations;

enable a display of the plurality of probable routes on a user interface that includes a plurality of tabs, wherein each tab of the plurality of tabs corresponds to one issue of the one or more issues and selection of the tab displays data that caused the ML data model corresponding to the issue associated with the tab to generate one or more of the plurality of probable routes;

receive via the user interface, user selection of one of the probable solutions for implementation in executing the tasks associated with construction of the proposed roadway; and update the selected, trained ML data models and the relevant data in the local data stores based on feedback received from execution of the task.

18. The non-transitory computer-readable storage medium of claim 17, wherein the instructions for selecting the multiple ML data models further comprising machine-readable instructions that cause the processor to:
select the multiple ML data models based on preconfigured selection instructions associated with one or more of the task and the issues.

19. The natural language processing (NLP) based solution generation and planning system of claim 1 wherein the issues include geographical issues, environmental issues and economic issues.

20. The NLP based solution generation and planning system of claim 1, wherein the machine-readable instructions for the evaluation of the plurality of possible routes comprise further instructions that cause processor to:

evaluate various combinations of the plurality of possible routes, wherein the evaluation is based on compliance of each of the plurality of possible routes with predetermined practices implemented for the plurality of issues and the evaluation is executed by further ML data models based on vector distances.

\* \* \* \* \*